US012340789B2

(12) United States Patent
Tiefenau et al.

(10) Patent No.: US 12,340,789 B2
(45) Date of Patent: Jun. 24, 2025

(54) HEARING APPARATUS WITH BONE CONDUCTION SENSOR

(71) Applicant: GN Hearing A/S, Ballerup (DK)

(72) Inventors: Andreas Tiefenau, Gammel Holte (DK); Brian Dam Pedersen, Ringsted (DK); Antonie Johannes Hendrikse, Eindhoven (NL); Anuj Dev, Amsterdam (NL)

(73) Assignee: GN HEARING A/S, Ballerup (DK)

( * ) Notice: Subject to any disclaimer, the term of this patent is extended or adjusted under 35 U.S.C. 154(b) by 0 days.

(21) Appl. No.: 17/509,892

(22) Filed: Oct. 25, 2021

(65) Prior Publication Data

US 2023/0290333 A1 Sep. 14, 2023

Related U.S. Application Data

(63) Continuation of application No. PCT/EP2020/062561, filed on May 6, 2020.

(30) Foreign Application Priority Data

May 6, 2019 (EP) .................................... 19172713

(51) Int. Cl.
*G10L 13/047* (2013.01)
*G10L 13/02* (2013.01)
*H04R 25/00* (2006.01)

(52) U.S. Cl.
CPC ............ *G10L 13/047* (2013.01); *G10L 13/02* (2013.01); *H04R 25/507* (2013.01);
(Continued)

(58) Field of Classification Search
CPC ... G10L 13/047; H04R 25/507; H04R 25/606; H04R 25/554; H04R 2225/55
See application file for complete search history.

(56) References Cited

U.S. PATENT DOCUMENTS 4,588,867 A 5/1986 Konomi
5,280,524 A 1/1994 Norris
(Continued)

FOREIGN PATENT DOCUMENTS

CN 105185371 12/2015
CN 106782577 5/2017
(Continued)

OTHER PUBLICATIONS

Valin, J. M., & Skoglund, J. (May 2019). LPCNet: Improving neural speech synthesis through linear prediction. In ICASSP 2019—2019 IEEE International Conference on Acoustics, Speech and Signal Processing (ICASSP) (pp. 5891-5895). IEEE. (Year: 2019).*
(Continued)

*Primary Examiner* — Bhavesh M Mehta
*Assistant Examiner* — Philip H Lam
(74) *Attorney, Agent, or Firm* — Vista IP Law Group, LLP

(57) ABSTRACT

The present disclosure relates to a hearing apparatus comprising: a bone conduction sensor configured to convert bone vibrations of voice sound information into a bone conduction signal; a signal processing unit configured to implement a synthetic speech generation process, the synthetic speech generation process implementing a speech model; wherein the synthetic speech generation process receives the bone conduction signal as a control input and outputs a synthetic speech signal.

22 Claims, 8 Drawing Sheets

(52) U.S. Cl.
CPC ......... *H04R 25/606* (2013.01); *H04R 25/554* (2013.01); *H04R 2225/55* (2013.01)

(56) References Cited

U.S. PATENT DOCUMENTS

| | | | | |
|---|---|---|---|---|
| 5,692,059 | A | 11/1997 | Kruger | |
| 5,794,191 | A * | 8/1998 | Chen | G10L 15/16 704/E15.017 |
| 6,354,299 | B1 | 3/2002 | Fischell et al. | |
| 7,676,372 | B1 * | 3/2010 | Oba | G09B 21/009 704/271 |
| 8,200,486 | B1 * | 6/2012 | Jorgensen | G10L 15/24 704/231 |
| 2005/0049856 | A1 * | 3/2005 | Baraff | G10L 21/0208 704/219 |
| 2005/0114137 | A1 * | 5/2005 | Saito | G10L 13/10 704/260 |
| 2008/0220718 | A1 * | 9/2008 | Sakamoto | H04B 1/385 455/563 |
| 2010/0183161 | A1 * | 7/2010 | Boretzki | H04R 25/70 381/60 |
| 2012/0278070 | A1 * | 11/2012 | Herve | G10L 21/0208 704/226 |
| 2013/0195302 | A1 * | 8/2013 | Meincke | H04R 25/356 381/321 |
| 2015/0139459 | A1 * | 5/2015 | Olsen | H04R 25/552 381/315 |
| 2015/0228271 | A1 * | 8/2015 | Morita | G10L 13/033 704/258 |
| 2015/0242180 | A1 * | 8/2015 | Boulanger-Lewandowski | G06N 3/044 700/94 |
| 2016/0030744 | A1 * | 2/2016 | Hubert-Brierre | G10L 21/10 607/57 |
| 2016/0343387 | A1 * | 11/2016 | Kamamoto | G10L 25/12 |
| 2017/0295439 | A1 * | 10/2017 | Xu | A61N 1/36036 |
| 2017/0323636 | A1 * | 11/2017 | Xiao | G06N 3/044 |
| 2018/0113673 | A1 * | 4/2018 | Sheynblat | G10L 17/00 |
| 2018/0310159 | A1 * | 10/2018 | Katz | H04W 4/50 |
| 2018/0331668 | A1 * | 11/2018 | Yuzuriha | G10L 21/0208 |
| 2018/0343525 | A1 * | 11/2018 | Karlsen | H04R 25/02 |
| 2018/0367882 | A1 * | 12/2018 | Watts | H04R 1/1083 |
| 2019/0222943 | A1 * | 7/2019 | Andersen | H04R 25/507 |
| 2020/0135171 | A1 * | 4/2020 | Tachibana | G10L 13/02 |
| 2021/0020161 | A1 * | 1/2021 | Gao | G10L 13/08 |
| 2021/0327407 | A1 * | 10/2021 | Chae | G10L 13/10 |

FOREIGN PATENT DOCUMENTS

| | | |
|---|---|---|
| CN | 109120790 | 1/2019 |
| EP | 3188507 | 7/2017 |
| EP | 3229496 | 10/2017 |
| WO | WO 00/69215 | 11/2000 |

OTHER PUBLICATIONS

Srinivasan, S., & Kechichian, P. (Sep. 2012). Robustness analysis of speech enhancement using a bone conduction microphone—preliminary results. In IWAENC 2012; International Workshop on Acoustic Signal Enhancement (pp. 1-4). VDE. (Year: 2012).*

Kapur, A., Kapur, S., & Maes, P. (Mar. 2018). Alterego: A personalized wearable silent speech interface. In 23rd International conference on intelligent user interfaces (pp. 43-53). (Year: 2018).*

Shahina, A., & Yegnanarayana, B. (2007). Mapping speech spectra from throat microphone to close-speaking microphone: A neural network approach. EURASIP Journal on Advances in Signal Processing, 2007, 1-10. (Year: 2007).*

Shan, D., Zhang, X., Zhang, C., & Li, L. (2018). A novel encoder-decoder model via NS-LSTM used for bone-conducted speech enhancement. IEEE Access. Oct. 4, 2018; 6: 62638-44. (Year: 2018).*

Liu, H. P., Tsao, Y., & Fuh, C. S. (2018). Bone-conducted speech enhancement using deep denoising autoencoder. Speech Communication, 104, 106-112. (Year: 2018).*

Liu, R., Cornelius, C., Rawassizadeh, R., Peterson, R., & Kotz, D. (2018). Vocal resonance: Using internal body voice for wearable authentication. Proceedings of the ACM on Interactive, Mobile, Wearable and Ubiquitous Technologies, 2(1), 1-23. (Year: 2018).*

Huang, B., Gong, Y., Sun, J., & Shen, Y. (Aug. 2017). A wearable bone-conducted speech enhancement system for strong background noises. In 2017 18th International Conference on Electronic Packaging Technology (ICEPT) (pp. 1682-1684). IEEE. (Year: 2017).*

Maruri, H. A. C., Lopez-Meyer, P., Huang, J., Beltman, W. M., Nachman, L., & Lu, H. (2018). V-Speech: noise-robust speech capturing glasses using vibration sensors. Proceedings of the ACM on Interactive, Mobile, Wearable and Ubiquitous Technologies, 2(4), 1-23. (Year: 2018).*

Turan, M. A. T. (2018). Enhancement of throat microphone recordings using gaussian mixture model probabilistic estimator. arXiv preprint arXiv:1804.05937. (Year: 2018).*

Turan, M. T., & Erzin, E. (2015). Source and filter estimation for throat-microphone speech enhancement. IEEE/ACM Transactions on Audio, Speech, and Language Processing, 24(2), 265-275. (Year: 2015).*

Extended European Search Report for EP Patent Appln. No. 19172713.0 dated Jun. 25, 2019.

Lee, C., et al., "Bone-Conduction Sensor Assisted Noise Estimation for Improved Speech Enhancement," Department of Electrical and Computer Engineering University of California, San Diego, Interspeech 2018.

"Reconstruction Filter Design for Bone-Conducted Speech"_T. Tamiya and T. Shimamura, Interspeech 2004—ICSLP 8th International Conference on Spoken Language Processing, ICC Jeju, Jeju Island, Korea, Oct. 4-8, 2004.

Kalchbrenner, N., et al., "Efficient Neural Audio Synthesis," dated Jun. 2018.

Ping, W., et al., "ClariNet: ParallelWave Generation in End-to-End Text-to-Speech," Baidu Research, Feb. 2019.

Foreign OA for CN Patent Appln. No. 202080044974.3 dated Aug. 8, 2023.

"LPCNET: Improving Neural Speech Synthesis Through Linear Prediction" (Jaen-Marc Valin & Jan Skoglund), dated Feb. 19, 2019.

Written Opinion for Foreign Patent Appln. No. PCT/EP2020/062561 dated Aug. 31, 2020.

International Search Report for Foreign Patent Appln. No. PCT/EP2020/062561 dated Aug. 31, 2020.

English Translation for Foreign OA for CN Patent Appln. No. 20208004974.3 dated Aug. 8, 2023.

Foreign Exam Report for EP Patent Appln. No. 20722603.6 dated Jan. 30, 2024.

Translation of foreign office action dated Apr. 25, 2024 for Chinese Appln. No. 202080044974.3.

Foreign OA for CN Patent Appln. No. 202080044974.3 dated Aug. 13, 2024.

Translation of foreign office action dated Aug. 13, 2024 for Chinese Appln. No. 202080044974.3.

* cited by examiner

HEARING APPARATUS WITH BONE CONDUCTION SENSOR

RELATED APPLICATION DATA

This application is a continuation of International Patent Application No. PCT/EP2020/062561 filed on May 6, 2020, which claims priority to, and the benefit of European Patent Application No. EP 19172713.0 filed on May 6, 2019. The entireties of all of the above applications are expressly incorporated by reference herein.

FIELD

The present disclosure relates to a hearing apparatus comprising a bone conduction sensor.

BACKGROUND

Acquiring a clean speech signal is of considerable interest in numerous communication applications that involve head-wearable hearing devices such as headsets, active hearing protectors and hearing instruments or aids. Once obtained, a clean speech signal may be supplied to a far-end recipient of the clean speech signal, e.g. via a wireless data communication link, so as to provide a more intelligible and/or more comfortably sounding speech signal. It is generally desirable to obtain a clean speech signal that provides improved speech intelligibly and/or better comfort for the far recipient e.g. during a phone conversation, as an input to speech recognition systems, voice control systems, etc.

However, sound environments in which the user of the head-wearable hearing device is situated are often corrupted or infected by numerous noise sources such as interfering speakers, traffic noise, loud music, noise from machinery etc. Such environmental noise sources may result in a poor signal-to-noise ratio of a target speech signal when the speaker's voice is picked up by a microphone which records airborne sounds. Such microphones may be sensitive to sound arriving from all directions from the user's sound environment and hence tend to indiscriminately pick up all ambient sounds and transmit these as a noise-infected speech signal to the far end recipient. While environmental noise problems may be mitigated to a certain extent by using a microphone with certain directional properties or using a so-called boom-microphone (typical for headsets), there is a need in the art for a hearing apparatus with improved signal quality, in particular improved signal-to-noise ratio, of the user's speech as transmitted to far-end recipients over e.g. a wireless data communication link. The latter may comprise a Bluetooth link or network, Wi-Fi link or network, GSM cellular link, a wired connected, etc.

EP3188507 discloses a head-wearable hearing device which detects and exploits a bone conducted component of the user's own voice picked-up in the user's ear canal to provide a hybrid speech/voice signal with improved signal-to-noise ratio under certain sound environmental conditions for transmission to the far end recipient. The hybrid speech signal may in addition to the bone conducted component of the user's own voice also comprise a component/contribution of the user's own voice as picked-up by an ambient microphone arrangement of the head-wearable hearing device. This additional voice component derived from the ambient microphone arrangement may comprise a high frequency component of the user's own voice to at least partly restore the original spectrum of the user's voice in the hybrid microphone signal.

WO 00/69215 discloses a voice sound transmitting unit having an earpiece that is adapted for insertion into the external auditory canal of a user, the earpiece having both a bone conduction sensor and an air conduction sensor. The bone conduction sensor is adapted to contact a portion of the external auditory canal to convert bone vibrations of voice sound information into electrical signals. The air conduction sensor resides within the auditory canal and converts air vibrations of the voice sound information into electrical signals. In its preferred form, a speech processor samples output from the bone conduction sensor and the air conduction sensor to filter noise and select a pure voice sound signal for transmission. The transmission of the voice sound signal may be through a wireless linkage and may also be equipped with a speaker and receiver to enable two-way communication.

While the bone conduction signal has the advantage that sounds and environmental noise have little or no influence on the bone conduction signal, a bone conduction signal has a number of deficiencies when using it to represent a speaker's voice. The bone conduction signal often sounds muffled; it often misses higher frequencies and/or suffers from other artifacts due to body conductance versus air conductance of sound. Moreover, the bone conduction signal may include other sounds, such as sounds originating from swallowing, jaw-movements, ear-earpiece friction, and/or the like. The bone conduction signal may be prone to other sensor noise (hiss) due to imperfect earpiece fitting or mechanical coupling.

Various attempts have been made to improve the quality of the signal resulting from the bone vibration sensor. To this end various filter techniques have been proposed. For example, the article "Reconstruction Filter Design for Bone-Conducted Speech" by T. Tamiya and T. Shimamura, Interspeech 2004—ICSLP 8$^{th}$ International Conference on Spoken Language Processing, ICC Jeju, Jeju Island, Korea, Oct. 4-8, 2004 addresses a digital filter to reconstruct the quality of the bone-conducted speech signal obtained from a speaker.

Nevertheless, it remains desirable to provide a hearing apparatus that increases the quality of the obtained speech signal from a hearing apparatus with a bone conduction sensor and/or to provide an alternative thereto.

SUMMARY

According to a first aspect, the present disclosure relates to a hearing apparatus comprising:

- a bone conduction sensor configured to record a bone conduction signal indicative of bone-conducted vibrations conducted by the bones of a wearer of the hearing apparatus;
- a signal processing unit configured to implement a synthetic speech generation process, the synthetic speech generation process implementing a speech model;
- wherein the synthetic speech generation process receives a representation of the bone conduction signal as a control input and outputs a synthetic speech signal, wherein the synthetic speech generation process implements a time series predictor configured to predict a current sample of a time series from one or more previous samples of the time series, the time series representing a speech waveform, wherein the prediction is conditioned on the representation of the bone conduction signal.

The inventors have realised that a high-quality speech reconstruction may be obtained by employing a synthetic speech model that creates synthetic speech and to use the bone conduction signal from the bone conduction sensor to steer the synthetic speech construction process. In particular, the synthetic speech generation process is configured to produce artificial human speech. The synthetic speech generation process may synthesize a waveform of an audio signal representing the artificial speech. Embodiments of the signal processing unit thus implement a speech synthesiser for artificial production of human speech. The speech synthesiser includes a speech model, i.e. the speech generation process knows how to generate a speech signal. Some embodiments of the speech synthesizer are capable of generating a speech signal even in the absence of any control input.

In some embodiments the speech model is a speech model that, during operation, defines an internal state where the internal state evolves over time. Hence, the speech model exhibits temporal dynamic behaviour, thus facilitating the creation of a time series representing a waveform of an audio signal.

In some embodiments, the speech model is a trained machine learning model. In particular, the machine learning model may be trained during a training phase based on a plurality of training speech examples. Each training speech example may comprise a training bone conduction signal representing a speaker's speech and a corresponding training microphone signal representing airborne sound recorded by an ambient microphone, the airborne sound being recorded of said speaker's speech, in particular recorded concurrently with the recording of the training bone conduction signal. The machine learning model may thus be trained by a machine learning algorithm to create, when controlled by the training bone conduction signal, synthetic speech approximating the training microphone signal. The training microphone signal is thus used as a target signal in a training phase. Once the machine learning model is trained it may generate synthesized speech based only on the bone conduction signal, i.e. an ambient microphone signal is not required as input to the trained speech model when operated as a speech synthesizer. The speech model is thus configured to generate synthesized speech based only on the bone conduction signal, the generated synthesized speech approximating an air-conducted voice sound, The synthetic speech generation process feeds a representation of the bone conduction signal as an input into the speech model. The representation may represent the bone conduction signal or one or more features thereof, in particular one or more time-dependent features of the bone conduction signal. The synthetic speech generation process does not require any recognition of the speech, i.e. it does not require the process to infer a meaning of the speech.

The creation of the machine-learning speech model requires few assumptions of the actual speech and little a priori knowledge about the features of the speech to be reconstructed. Instead, the model is created based on a pool of training examples. In particular the training examples may comprise bone conduction signals and ambient microphone signals representing speech of the particular user of the hearing apparatus. Hence, the hearing apparatus may be adapted to a particular user and the speech model trained to synthesize the voice of the particular user.

The trained speech model may be used to synthesize artificial speech upon receipt of a bone conduction signal. In particular, the speech model may be configured to synthesize the artificial speech based on the bone conduction signal as its only input, in particular its only control input. The control input may be an input representing a conditional signal to the speech model; wherein the speech model is configured to predict a synthetic speech conditioned on the control signal, i.e. the control signal may serve as a conditional to a probabilistic speech model, e.g. to a probabilistic time series prediction process configured to predict a waveform representing the synthetic speech.

In some embodiments the machine learning model comprises a neural network model. In particular, in some embodiments, the neural network model comprises one or more layers of a layered neural network model such as at least two layers, such as at least three layers. The neural network may be a deep neural network comprising at least three network layers, such as at least four network layers. It will be appreciated that the number of layers may be selected based on the desired design accuracy of the model. It will further be appreciated that other embodiments may employ other types of machine learning models.

One of the one or more layers may be a recurrent neural network, optionally followed by one or more additional layers, e.g. including a softmax layer or another hard- or soft classification or decision layer. In some embodiments, the recurrent neural network is operated in a density estimation mode.

In some embodiments, the speech model comprises an autoregressive speech model. In particular, the speech model may output a sequence of predicted samples representing a synthetic speech waveform. The synthetic speech creation process may be configured to feed one or more previous samples of the sequence of predicted samples as a feedback input to the autoregressive speech model and the autoregressive speech model may be configured to predict a current sample of the sequence of predicted samples from the one or more previous samples and further conditioned on one or more samples of a representation of the bone conduction signal. Generally, the synthetic speech generation process and/or the speech model implements a time series predictor configured to predict a current sample of the time series representing the speech waveform from one or more previous samples of the time series, wherein the prediction is conditioned on a representation of the bone conduction signal, e.g. where the representation of the bone conduction signal serves as a conditional for calculating the speech signal from a conditional probability, conditioned on the representation of the bone conduction signal.

The autoregressive input signal to the speech model may be encoded in a number of ways, e.g. as a continuous variable or using one hot encoding. The encoding may be linear, u-law, Gaussian and/or the like.

The predicted samples of the sequence of predicted samples output by the speech model may be represented as a sampled probability distribution over a plurality of output classes. Accordingly, in some embodiments, the speech model computes a probability distribution over a plurality of output classes, each output class representing a sample value of a sample of a sampled audio waveform. For example, each class may represent a value of the predicted audio signal that represents the synthesized speech. For example, if the audio signal is encoded as an 8-bit signal, the speech model may have 256 outputs. The probability distribution may be sampled, and the sample may be passed as an output of the synthetic speech generation process. The sample may also be passed to the input of the speech model for the prediction of a subsequent sample.

For the purpose of steering, e.g. as a conditional to a conditional prediction process, the synthetic speech model, the bone conduction signal may be represented in a number of ways. Reference to the bone conduction signal as used herein thus generally refers to a suitable representation of the bone conduction signal, i.e. the raw bone conduction signal or a suitably processed version of the bone conduction signal, e.g. a filtered and/or an up- or down-sampled version of the bone construction signal and/or a suitably transformed version of the bone conduction signal, e.g. a time and/or frequency representation of the bone-conduction signal. The representation of the bone conduction signal may represent a waveform varying at a suitable time-scale. The representation of the bone conduction signal may be a representation, which contains information of the envelope shape of speech signals. In some embodiments, the signal processing unit is configured to process the bone conduction signal to provide a MEL transform of the bone conduction signal. Use of a MEL representation may allow a 'seamless' integration of some speech synthesis algorithms. Moreover, a MEL representation may be beneficial due to the knowledge of human hearing (log frequency) that is embedded in the MEL transform.

In another embodiment the bone conduction signal is directly provided as sampled version of a single continuous signal, thus obtaining low latency. The signal may be sampled at the same rate as, or at a lower rate than, the sequence of predicted samples. In such embodiments, the speech model may utilize the entire information present in the bone conduction signal at a matching sample rate.

The hearing apparatus may be implemented as a single hearing device, e.g. a head-worn hearing device, or as an apparatus comprising multiple devices communicatively coupled to each other. The head-worn hearing device may comprise the bone conduction sensor and a first communications interface.

In particular, in some embodiments, the hearing apparatus comprises a head-worn hearing device comprising the bone conduction sensor, first communications interface and the signal processing. In this embodiment, the head-worn device may be configured to communicate the synthetic speech signal via the first communications interface to an external device, external to the head-worn hearing device.

In other embodiments, the hearing apparatus comprises a head-worn device and a signal processing device. The head-worn hearing device comprises the bone conduction sensor and the first communication interface for communicating the bone conduction signal to the signal processing device. The signal processing device comprises a second communications interface for receiving the bone conduction signal and at least part, such as all, of the signal processing unit implementing the synthetic speech generation process. Accordingly, the processing requirements of the head-worn hearing device are reduced.

The communication between the head-worn hearing device and the signal processing device may be wired or wireless. In some embodiments, the hearing device comprises a wireless communications interface, e.g. comprising an antenna and a wireless transceiver. Similarly, the signal processing device may comprise a wireless communications interface, e.g. comprising an antenna and a wireless transceiver.

The wireless communication may be via a wireless data communication link such as a bi-directional or unidirectional data link. The wireless data communication link may operate in the industrial scientific medical (ISM) radio frequency range or frequency band such as the 2.40-2.50 GHz band or the 902-928 MHz band, e.g. using Bluetooth low energy communication or another suitable short-range radio-frequency communication technology.

Wired communication may be via a wired data communication interface which may e.g. comprise a USB, IIC or SPI compliant data communication bus for transmitting the bone conduction signal to a separate wireless data transmitter or communication device such as a smartphone, or tablet.

The hearing apparatus may be configured to apply the generated synthetic speech signal to a subsequent processing stage, e.g. a subsequent processing stage implemented by the hearing apparatus, such as by the signal processing device, and/or to a subsequent processing stage implemented by a device external to the hearing apparatus.

To this end, the hearing apparatus may provide the created synthetic speech signal as an output in a variety of ways. For example, in embodiments where the signal processing unit is included in a head-worn hearing device, the head-worn hearing device may communicate the created synthetic speech signal to a user accessory device, such as a mobile phone, a tablet computer and/or the like. To this end, the head-worn hearing device may communicate the created synthetic speech signal via a wired or wireless communications link, e.g. as described above. The user accessory device may e.g. use the received synthetic speech signal as an input to a voice controllable function, e.g. a voice controllable software application executed on the user accessory device. Alternatively or additionally, the user accessory device may send the synthetic speech signal to a remote system, e.g. via a cellular communications network or via another wired or wireless communications link, such as a Bluetooth low energy link, via a cellular communications network, and/or the like.

Similarly, in embodiments where the signal processing unit is included in a signal processing device separate from the head-worn hearing device, the signal processing device may itself use the received synthetic speech signal as an input to a voice controllable function of the signal processing device, e.g. a voice controllable software application executed on the signal processing device. Alternatively or additionally, the signal processing device may send the synthetic speech signal to a remote system, e.g. via a cellular communications network or via another wired or wireless communications link, such as a Bluetooth low energy link, via a cellular communication network, and/or the like.

Accordingly, in some embodiments, the hearing apparatus comprises an output interface configured to provide the generated synthetic speech signal as an output of the hearing apparatus. The output interface may be a loudspeaker or a communications interface, such as a wired or wireless communications interface configured to transmit the generated synthetic speech signal to one or more remote systems e.g. via a wired or wireless communications link. In embodiments, where the hearing apparatus is implemented as a head-worn hearing device that includes the signal processing unit, the head-worn hearing device may also comprise the output unit. In embodiments, where the hearing apparatus comprises a head-worn hearing device and a separate signal processing device, the signal processing device may comprise the output unit.

Examples of subsequent processing stages may include a voice recognition stage, a mixer stage for combining the artificial speech signal with one or more additional signals, a filtering stage, etc.

The bone conduction sensor is configured to record a bone conduction signal indicative of bone-conducted vibrations conducted by the bones of the wearer of the hearing apparatus, in particular of the head-worn hearing device, when the wearer of the hearing apparatus, in particular of the head-worn hearing device, speaks. The bone conducting sensor provides a bone conduction signal indicative of the recorded vibrations. Generally, the wearer of the hearing apparatus, in particular of the head-worn device, will also be referred to as the user of the hearing apparatus. The bone vibrations carry information of the voice sound of the user of the hearing apparatus when the user speaks. It will be appreciated that some of the bone-conducted vibrations may have other sources, such as sounds originating from swallowing, jaw-movements, ear-earpiece friction, and/or the like. For the purpose of the present description, these may be considered noise. Accordingly, for the purpose of the present description, the bone vibrations converted by the bone conduction signal will also be referred to as vibrations of voice sound, since they carry information about the voice sound of the user when the user speaks. The bone conduction sensor may be an ear-canal microphone, an accelerometer, a vibration sensor, or another suitable sensor for recording bone conducted vibrations when the wearer of the hearing apparatus speaks. Suitable examples of bone conduction sensors are disclosed in EP3188507 and WO 00/69215.

In some embodiments, the hearing apparatus comprises an ambient microphone configured to record air-borne speech spoken by a user of the hearing apparatus and to provide an ambient microphone signal indicative of the recorded air-born speech. In some embodiments, the head-worn hearing device comprises the ambient microphone. Alternatively or additionally, in embodiments where the hearing apparatus comprises a head-worn hearing device and a separate signal processing device, the signal processing device may comprise the ambient microphone, thus reducing the transmission requirements for the communications link between the head-worn hearing device and the signal processing device.

In some embodiments, the signal processing unit is configured to receive the ambient microphone signal as a target signal for use during a training phase for training the speech model. Alternatively or additionally, the signal processing unit may receive the ambient microphone signal during normal operation and create an output speech signal from the generated synthetic speech signal and from the ambient microphone signal.

In particular, when the ambient microphone signal is used during the training phase, the signal processing unit may be configured to be operable in a recording mode and/or a training mode. When operated in the recording mode and/or in the training mode, the signal processing unit receives the bone conduction signal and the ambient microphone signal where the ambient microphone signal is recorded concurrently with the bone conduction signal so as to represent a signal pair including the bone conduction signal and the ambient microphone signal, each representing the same speech of the wearer of the hearing apparatus. The bone conduction signal and the ambient microphone signal may thus be recorded as a pair of respective waveforms. To this end, the user may be instructed to speak different sentences or other speech portions in a low-noise environment where the bone conducted sound signal of the speaker is recorded by the bone conduction sensor and where the airborne sound is concurrently recorded by the ambient microphone signal.

Accordingly, the hearing apparatus may comprise a memory for storing training data, the training data comprising one or more signal pairs, each signal pair comprising a training bone conduction signal recorded by the bone conduction sensor and a training ambient microphone signal recorded by the ambient microphone concurrently with the recording of the training bone conduction signal of said signal pair.

When operated in the training mode, the signal processing unit may be configured to receive and, optionally, store one or a plurality of such signal pairs representing different speech portions, such as waveforms representing segments of recorded speech.

The one or more recorded signal pairs may thus be used as training data in a machine learning process for adapting the speech model, in particular for adapting adjustable model parameters of the speech model. The machine learning process may be performed by the signal processing unit and/or by an external data processing system.

Accordingly, in some embodiments, the signal processing unit is configured to be operated in a training mode; wherein the signal processing unit; when operated in the training mode, is configured to adapt one or more model parameters of the speech model based on a result of the synthetic speech generation process when receiving a training bone conduction signal and according to a model adaptation rule so as to determine an adapted speech model that provides an improved match between the created synthetic speech and a corresponding training ambient microphone signal.

When the training process is performed by an external data processing system, the signal processing unit may transmit the recorded training data to the external data processing system. The external data processing system may create a speech model or adapt an existing speech model based on the training data and return the corresponding created or adapted model parameters of the created or adapted speech model to the signal processing unit. The signal processing unit may forward the training examples continuously to the external data processing system e.g. via a suitable wired or wireless data communication links. Alternatively, the signal processing unit may store the training data in a memory of the hearing apparatus and provide the stored training data to the external data processing system, e.g. via a wired or wireless communications link and/or by storing the training data on a removable data carrier and/or the like.

When the signal processing unit itself performs the machine learning process, this may be done on-line or off-line. When performing an on-line training, the signal processing unit may continuously adapt the speech model as and when training data is recorded. When performing off-line training, the signal processing unit may, e.g. when operated in a recording mode, store a pool of training data in a memory of the hearing apparatus, the pool comprising a plurality of signal pairs of fixed or variable lengths. When operated in training mode, the signal processing unit may perform the training process based on the stored pool of training data. It will be appreciated that various combinations of on-line and off-line training are possible, e.g. an off-line training of an initial speech model by an external data processing system or by the signal processing unit based on a large initial training set in combination with subsequent on-line or off-line adaptations of the initial speech model. Performing at least a part of the training process by a separate signal processing device or even by a remote data processing system reduces the need for computational power in the head-worn hearing device.

In any event, an embodiment of the training process may create synthetic speech using a current speech model when the current speech model receives one or more recorded training bone conduction signals as a control input, e.g. as a conditional to a probabilistic time series prediction process. The training process may further compare the thus created synthetic speech with the corresponding one or more training ambient microphone signals that were recorded concurrently with the respective training bone conduction signals. The training process may further adapt one or more model parameters of the current speech model responsive to a result of the comparison and according to a model adaptation rule so as to determine an adapted speech model that provides an improved match between the created synthetic speech and the corresponding training ambient microphone signal. This process may be repeated in an iterative fashion, e.g. until a predetermined model quality criterion is fulfilled, thus resulting in a trained speech model. Preferably, at least an initial training process is based on a large data set of training data that covers a wide variety of speech and speech related artefacts such as teeth clicks, jaw movements, swallowing etc.

Alternatively or additionally, the ambient microphone signal may be used during normal operation of the hearing apparatus, i.e. after training of the speech model and in combination with the trained speech model. In particular, in some embodiments, the synthetic speech model may be trained to reconstruct a filtered version of the ambient microphone signal. The filtered version may be obtained by a first filter, e.g. a low-pass filter. During subsequent normal operation of the hearing apparatus using the trained speech model, the signal processing unit may receive the bone conduction signal from the bone conduction sensor and the concurrently recorded ambient microphone signal from the ambient microphone. The signal processing unit may create a synthetic speech signal using the trained speech model. The signal processing unit may further create a filtered version of the received ambient microphone signal using a second filter, complementary to the first filter. For example, when the first filter is a low-pass filter having a first cut-off frequency, the second filter may be a high-pass filter having a second cut-off frequency smaller than or equal to the first cut-off frequency. The signal processing unit may further be configured to combine, in particular mix, the created synthetic speech signal with the filtered version of the ambient microphone signal and to provide the combined signal as an output speech signal.

Accordingly, in some embodiments, the speech model is configured to generate a synthetic filtered speech signal, corresponding to a speech signal filtered by a first filter, when the speech model receives the bone conduction signal as a control, in particular conditional, input; and wherein the signal processing unit is configured to receive an ambient microphone signal from the ambient microphone, the ambient microphone signal being recorded concurrently with the bone conduction signal; to create a filtered version of the received ambient microphone signal using a second filter, complementary to the first filter, and to combine the generated synthetic filtered signal with the created filtered version of the received ambient microphone signal to create an output speech signal.

In particular, it has turned out that the bone conducted vibrations are particularly useful for reconstructing low frequencies of spoken speech while the bone conducted signal may be less useful for reconstructing high frequencies of the speech signal. Therefore, in some embodiments, the reconstructed low-frequency portion of the synthetic speech is combined with a high frequency portion of the actual ambient microphone signal.

The skilled person will understand that each of the above filtering functions may be implemented in numerous ways. In certain embodiments, a low-pass and/or high-pass filtering function comprises one or more FIR or IIR filters with predetermined frequency responses or adjustable/adaptable frequency responses. An alternative embodiment of the low pass and/or high-pass filtering functions comprises a filter bank such as a digital filter bank. The filter bank may comprise a plurality of adjacent bandpass filters arranged across at least a portion of the audio frequency range. The signal processing unit may be configured to generate or provide the low pass filtering function and/or the high-pass filter function as predetermined set(s) of executable program instructions running on the programmable microprocessor embodiment of the signal processor. Using the digital filter bank, the low-pass filtering function may be carried out by selecting respective outputs of a first subset of the plurality of adjacent bandpass filters; and/or the high-pass filtering function may comprise selecting respective outputs of a second subset of the plurality of adjacent bandpass filters. The first and second subsets of adjacent bandpass filters of the filter bank may be substantially non-overlapping except at the respective cut-off frequencies discussed below.

The low-pass filtering function may have a cut-off frequency, e.g. selected between 800 Hz and 2.5 kHz, such as between 1 kHz and 2 kHz; and/or the high pass filtering function may have a cut-off frequency between 800 Hz and 2.5 kHz, such as between 1 kHz and 2 kHz. In one embodiment, the cut-off frequency of the low-pass filtering function is substantially identical to the cut-off frequency of the high-pass filtering function. According to another embodiment, a summed magnitude of the respective output signals of the low-pass filtering function and high pass filtering function is substantially unity at least in a region of overlap. The two latter embodiments of the low-pass and high-pass filtering functions typically will lead to a relatively flat magnitude of the summed output of the filtering functions.

The head-worn hearing device may be a hearing instrument or hearing aid, an earphone, a headset, a hearing-protection device, etc. Generally, the head-worn hearing device may be a device worn at, behind and/or in a user's ear. In particular, in some embodiments, the head-worn hearing device may be a hearing aid configured to receive and deliver a hearing loss compensated audio signal to a user or patient via a loudspeaker. The hearing aid may be of the behind-the-ear (BTE) type, in-the-ear (ITE) type, in-the-canal (ITC) type, receiver-in-canal (RIC) type or receiver-in-the-ear (RITE) type. Typically, only a severely limited amount of power is available from a power supply of a hearing device. For example, power is typically supplied from a conventional $ZnO_2$ battery in a hearing aid. In the design of a head-worn hearing device, the size and the power consumption are important considerations. The head-worn hearing device may comprise one or more ambient microphones, configured to output an audio signal based on recorded ambient sound recorded by the ambient microphone(s). The head-worn hearing device may comprise a processing unit for performing signal and/or data processing. In particular the processing unit may comprise a hearing loss processor configured to compensate a hearing loss of a user of the head-worn hearing device and output a hearing loss compensated audio signal. The hearing loss compensated audio signal may be adapted to restore loudness such that loudness of the applied signal as it would have been perceived by a normal listener substantially matches the loudness of the hearing loss compensated signal as perceived by the user. The head-worn hearing device may additionally comprise an output transducer, such as a receiver or loudspeaker, an implanted transducer, etc., configured to output an auditory output signal based on the hearing loss compensated audio signal that can be received by the human auditory system, whereby the user hears the sound.

Generally, the signal processing unit of embodiments of the hearing apparatus may comprise or be communicatively coupled to a memory for storing model parameters of the speech model. In addition to adaptable model parameters that are adaptable during training of the speech model, the model parameters may include static parameters that are not adapted during training of the speech model. The static model parameters may be indicative of a model structure, e.g. a network topology of a neural network architecture. Such static model parameters may e.g. include the number and characteristics of network layers of a layered network structure, the number of nodes in the respective layers, the connectivity topology of the weights connecting the nodes of the respective layers, etc. It will be appreciated, however, that some training processes may include an adaptation of at least a part of the model topology, e.g. by pruning weights, and/or the like.

In any event, the model parameters include a plurality of adaptable model parameters that are adaptable during a training process. For example, in a neural network based speech model, the adaptable network parameters include the weights of the neural network whose values or strengths are adapted during the training process responsive to the comparison of the actual model output with a target output and based on a predetermined training rule. Examples of training rules include error backpropagation and/or other training rules known as such in the art of machine learning.

As mentioned above, in some embodiments the hearing apparatus comprises a signal processing device separate from a head-worn hearing device. The signal processing device may comprise the signal processing unit which may be implemented as a suitably programmed central processing unit. The signal processing device may further comprise a memory unit and a communications interface each communicatively connected to the signal processing unit. The memory unit may include one or more removable and/or non-removable data storage units including, but not limited to, Read Only Memory (ROM), Random Access Memory (RAM), etc. The memory unit may have a computer program stored thereon, the computer program comprising program code for causing the signal processing device to perform the synthetic speech generation process described herein and, optionally, a speech model training process as described herein. The communications interface may comprise an antenna and a wireless transceiver, e.g. configured for wireless communication at frequencies in the range from 2.4 to 2.5 GHz or in another suitable frequency range. The communications interface may be configured for communication, such as wireless communication, with the head-worn hearing device, e.g. using Bluetooth low energy. The communications interface may be for receipt of bone conduction signals and, optionally, ambient microphone signals from the head-worn device. In some embodiments the communications interface may also serve as an output interface for outputting the created synthetic speech signal. Alternatively or additionally, the signal processing device may comprise another output interface for outputting the generated synthetic speech signal, e.g. a cellular communications unit configured for data communication via a cellular communication network and/or another wired or wireless data communications interface. The signal processing device may be a mobile device such as a portable communications device, e.g. a smartphone, a smartwatch, a tablet computer or another processing device or system.

In some embodiments, the hearing apparatus comprises an ambient microphone configured to convert airborne vibrations into a microphone signal, wherein the synthetic speech generation process receives the microphone signal as a control input in addition to the bone conduction signal. In such embodiments, both the microphone signal and the bone conduction signal are input to the synthetic speech generation process. In particular, the speech model may map the microphone and bone conduction signals to 'clean speech'. Clean speech may generally be considered as being a speech signal in the absence of noise. This will further help the reconstruction of clean speech since an extra correlated signal is available for the prediction of the clean speech signal. When the speech model also has the microphone signal as input, the training speech examples may comprise noise components and/or the speech model may be configured to estimate noise components in the microphone signal and filter said noise components.

It will be appreciated that, in some embodiments the signal processing unit may be distributed between the hearing device and the signal processing device, e.g. such that a part of the signal processing, e.g. a preprocessing of the bone conduction signal provided by the bone conduction sensor, is performed by the head-worn hearing device while the remainder of the signal processing is performed by the signal processing device.

Regardless as to whether the signal processing unit is implemented as part of a head-worn hearing device or as part of a separate signal processing device, the signal processing unit may comprise a programmable microprocessor such as a programmable Digital Signal Processor executing a predetermined set of program instructions to perform the synthetic speech generation process. Signal processing functions or operations carried out by the signal processor may accordingly be implemented by dedicated hardware or may be implemented in one or more signal processors, or performed in a combination of dedicated hardware and one or more signal processors. For example, the signal processor may be an ASIC integrated processor, a FPGA processor, a general purpose processor, a microprocessor, a circuit component, or an integrated circuit.

The ambient microphone signal may be provided as a digital microphone input signal generated by an A/D-converter coupled to a transducer element of the microphone. Similarly, the bone conduction signal may be provided as a digital bone conduction signal generated by an ND-converter coupled to a transducer element or other sensing element of the bone conduction sensor. One or both of the above ND-converters may be separate from or integrated with the signal processing unit for example on a common semiconductor substrate. Each of the ambient microphone signal and the bone conduction signal may be provided in digital format at suitable sampling frequencies and resolutions. The sampling frequency of each of these digital signals may lie between 2 kHz and 48 kHz. The skilled person will understand that one or more respective signal processing functions, such as filtering, combining and/or the like may be performed by predetermined sets of executable program instructions and/or by dedicated and appropriately configured digital hardware. In some embodiments, the bone conduction signal may be pre-processed before applying it as a control input to the speech model, e.g. down sampled, filtered, etc.

The present disclosure relates to different aspects including the apparatus described above and in the following, corresponding apparatus, systems, methods, and/or products, each yielding one or more of the benefits and advantages described in connection with one or more of the other aspects, and each having one or more embodiments corresponding to the embodiments described in connection with one or more of the other aspects and/or disclosed in the appended claims.

In particular, according to one aspect, disclosed herein are embodiments of a computer-implemented method of obtaining a speech signal; comprising:

- receiving a bone conduction signal from a bone conduction sensor configured to convert bone vibrations of voice sound information into the bone conduction signal;
- using a speech model to generate a synthetic speech signal, wherein the speech model receives the bone conduction signal as a control input.

According to another aspect, disclosed herein are embodiments of a computer-implemented method of training a speech model for generating synthetic speech, the method comprising:

- receiving a plurality of pairs of training signals, each pair comprising a bone conduction signal from a bone conduction sensor and an ambient microphone signal from an ambient microphone where the ambient microphone signal is recorded concurrently with the bone conduction signal;
- using the bone conduction signals as a control input to the speech model;
- adapting the speech model based on a comparison of the synthetic speech generated by the speech model, when the speech model receives one or more of the bone conduction signals as a control input, with the respective one or more ambient microphone signals.

According to yet another aspect, disclosed herein are embodiments of a computer program product, the computer program product comprising computer program code configured to cause, when executed by a signal processing unit and/or a data processing system, the signal processing unit and/or data processing system to perform the acts of one or more of the methods disclosed herein.

The computer program product may be provided as a non-transitory computer-readable medium, such as a CD-ROM, DVD, optical disc, memory card, flash memory, magnetic storage device, floppy disk, hard disk, etc. In other embodiments, a computer program product may be provided as a downloadable software package, e.g. on a web server for download over the internet or other computer or communication network, or an application for download to a mobile device from an App store.

BRIEF DESCRIPTION OF THE DRAWINGS

In the following, preferred embodiments are described in more detail with reference to the appended drawings, wherein.

DETAILED DESCRIPTION

Figure 1A:
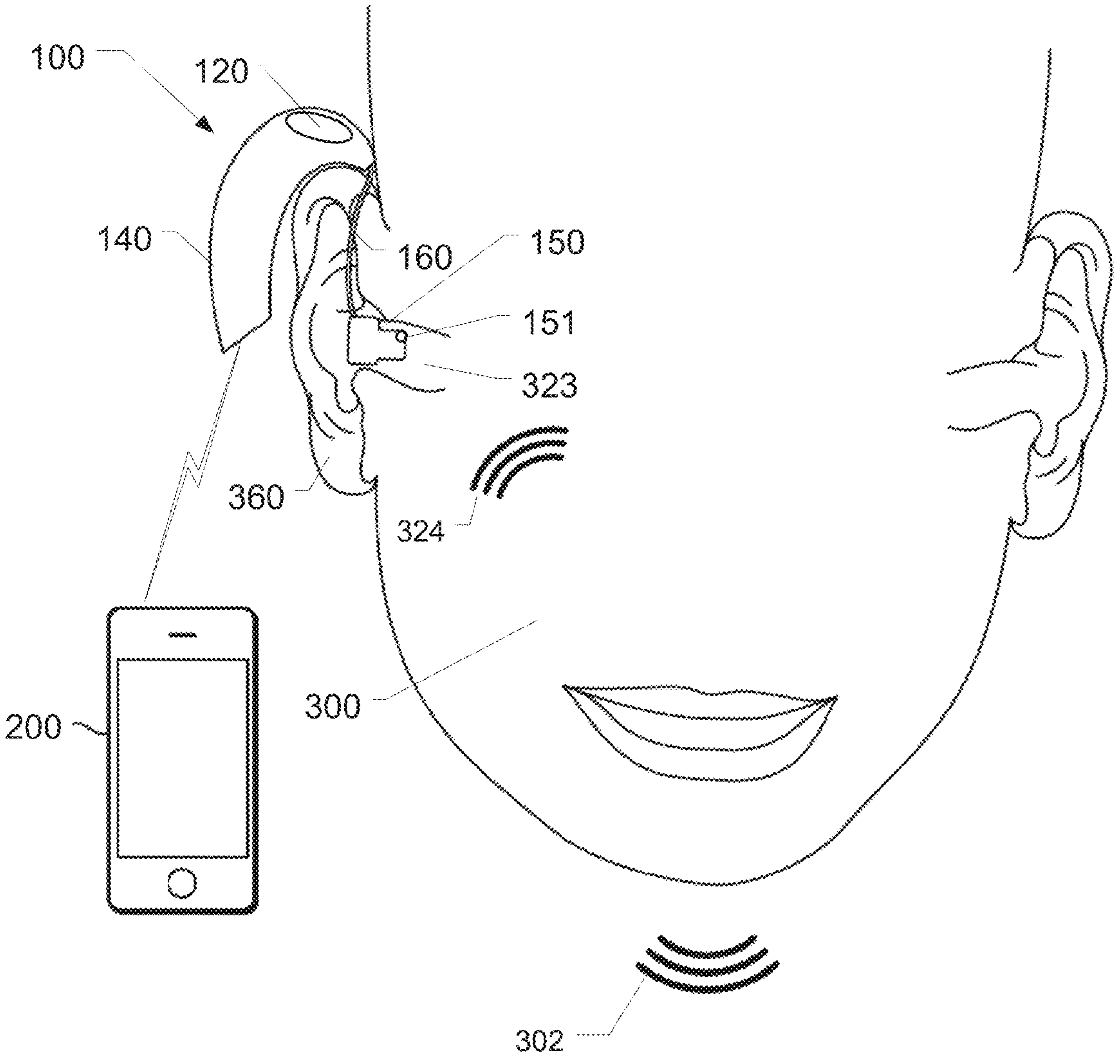
FIG. 1A schematically illustrates an example of a hearing apparatus.

Various embodiments are described hereinafter with reference to the figures. It should be noted that the figures may or may not be drawn to scale and that elements of similar structures or functions are represented by like reference numerals throughout the figures. It should also be noted that the figures are only intended to facilitate the description of the embodiments. They are not intended as an exhaustive description of the claimed invention or as a limitation on the scope of the claimed invention. In addition, an illustrated embodiment needs not have all the aspects or advantages of the invention shown. An aspect or an advantage described in conjunction with a particular embodiment is not necessarily limited to that embodiment and can be practiced in any other embodiments even if not so illustrated or if not so explicitly described.

Figure 1B:
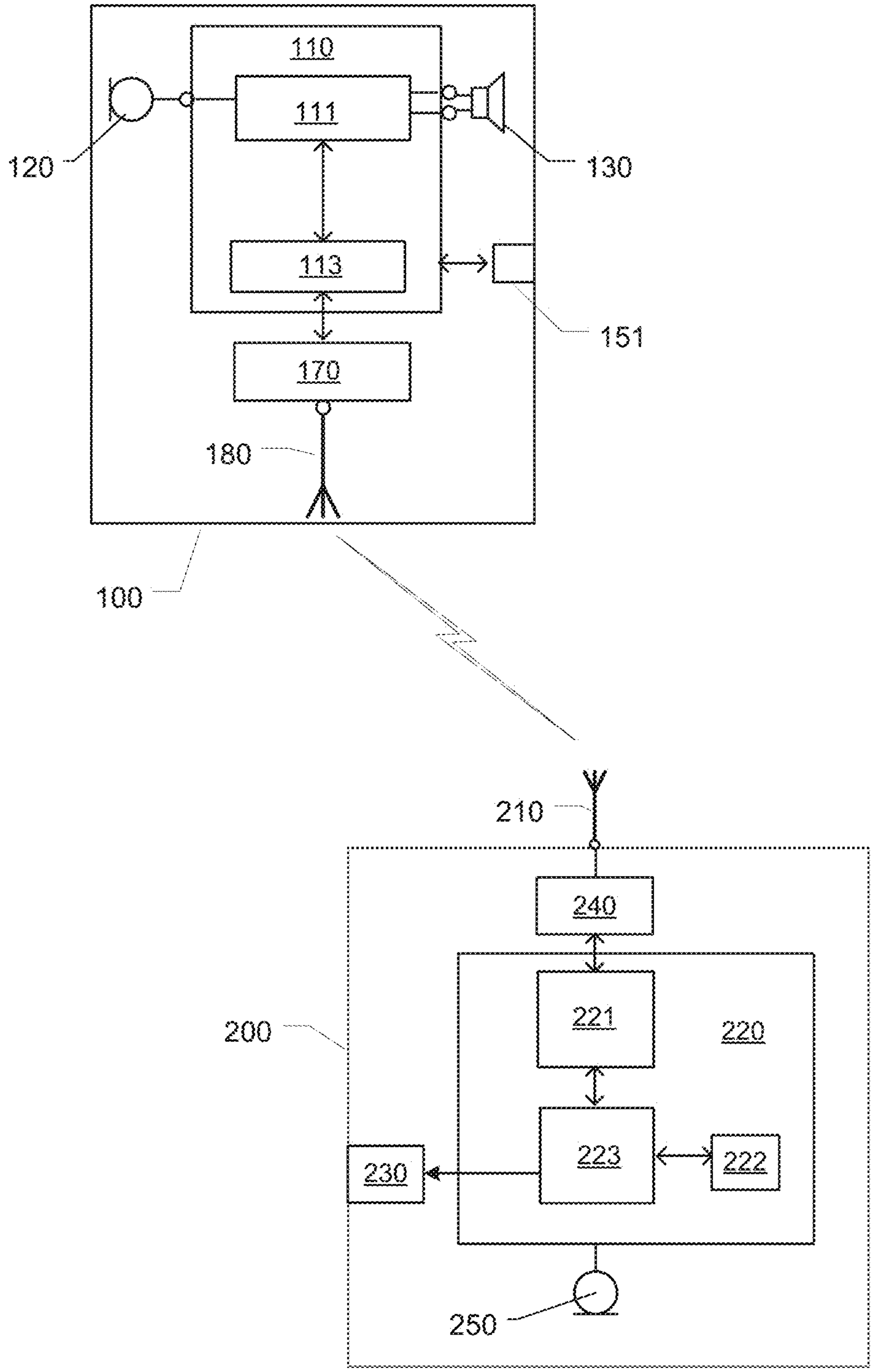
FIG. 1B schematically illustrates a block diagram of the hearing apparatus of FIG. 1A.

FIG. 1A schematically illustrates an example of a hearing apparatus and FIG. 1B schematically illustrates a block diagram of the hearing apparatus of FIG. 1A. The hearing apparatus comprises a head-worn hearing device 100 and a signal processing device 200. In the example of FIG. 1A, the hearing device 100 is a BTE hearing instrument or aid mounted on a user's ear 360 or ear lobe. It will be appreciated that other embodiments may include other types of hearing devices. For example, the skilled person will appreciate that other embodiments of the head-worn hearing device may comprise a headset or an active hearing protector.

The hearing device 100 comprises a housing or casing 140. In the example of the BTE hearing instrument of FIG. 1A, the housing is shaped and sized to fit behind the user's earlobe as schematically illustrated on the drawing. It will be appreciated that other types of hearing devices may have a housing of a different shape and/or size.

The housing 140 accommodates various components of the hearing device 100. The hearing device may comprise a $ZnO_2$ battery or other suitable battery (not shown) that is connected for supplying power to the electronic components of the hearing device. The hearing device 100 comprises an ambient microphone 120, a processing unit 110 and a loudspeaker or receiver 130.

The ambient microphone 120 may be configured for picking up environmental sound, e.g. through one or more sound ports or apertures leading to an interior of the housing 140. The ambient microphone 120 outputs an analogue or digital audio signal based on an acoustic sound signal arriving at the microphone 120 when the hearing device 100 is operating. If the microphone 120 outputs an analogue audio signal the processing unit 110 may comprise an analogue-to-digital converter (not shown) which converts the analogue audio signal into a corresponding digital audio signal for digital signal processing in the processing unit 110. The processing unit 110 comprises a hearing loss processor 111 that is configured to compensate a hearing loss of the user 300 of the hearing device 100. Preferably, the hearing loss processor 111 comprises a dynamic range compressor well-known in the art for compensation of frequency dependent loss of dynamic range of the user often termed recruitment in the art. Accordingly, the hearing loss processor 111 outputs a hearing loss compensated audio signal to the loudspeaker or receiver 130. The loudspeaker or receiver 130 converts the hearing loss compensated audio signal into a corresponding acoustic signal for transmission towards an eardrum of the user. Consequently, the user hears the sound arriving at the microphone 120 but compensated for the user's individual hearing loss. The hearing device may be configured to restore loudness, such that loudness of the hearing loss compensated signal as perceived by the user wearing the hearing device 100 substantially matches the loudness of the acoustic sound signal arriving at the microphone 120 as it would have been perceived by a listener with normal hearing. In some embodiments, the hearing device 100 may comprise more than one ambient microphones. For example, the hearing device may comprise a pair of omnidirectional microphones which may be used to provide directivity for example through a beamforming algorithm operating on the individual microphone signals supplied by the omnidirectional microphones. The beamforming algorithm may be executed on the processing unit 110 to provide a microphone input signal with certain directional properties.

In the example of FIG. 1A, the hearing device 100 comprises an ear mould or plug 150 which is inserted into the users ear canal where the mould 150 at least partly seals off an ear canal volume 323 from the sound environment surrounding the user. The hearing device 100 comprises a flexible sound tube 160 adapted for transmitting sound pressure generated by the receiver/loudspeaker 130, which may thus be placed within the housing 140, to the users ear canal through a sound channel extending through the ear mould 150.

The hearing device further comprises a bone conduction sensor 151, e.g. accommodated in the ear mould 150 as illustrated in FIG. 1A. The bone conduction sensor 151 is configured to generate an electronic bone conduction signal, either in digital format or analogue format, representative of the sensed bone-conducted vibrations when the user 300 utters voice sounds.

It will be appreciated that the bone conduction sensor may sense the bone conduction signal in a variety of ways. For example, the bone conduction sensor may be arranged such that it is brought into contact against a wall of the ear canal, e.g. against the posterior superior wall of the ear canal, when the ear mold 150 is inserted into the ear canal, e.g. as described in WO 00/69215. In other embodiments, the bone conduction sensor is arranged to be brought into contact against another part of the anatomical structure of the user's ear or another part of the user's head, e.g. outside the user's ear canal, e.g. at a position behind the user's ear. The skilled person will appreciate that the bone conduction sensor may be arranged at a different part of the head-worn hearing device, e.g. a part that is arranged to be brought in contact with the side of the user's head. In yet other embodiments, the bone conduction sensor is formed as an ear canal microphone configured for sensing or detecting the ear canal sound pressure in the user's fully or partly occluded ear canal volume 323. The ear canal volume 323 is arranged in front of the users tympanic membrane or ear drum (not shown), e.g. as described in EP3188507.

The electronic bone conduction signal may be transmitted to the processing unit 110 through a suitable electrical cable (not shown) for example running along an exterior or interior surface of the flexible sound tube 160. Alternative wired or unwired communication channels/links may be used for the transmission of the bone conduction signal to the processing unit. The ambient microphone 120, the processing unit 110 and the loudspeaker/receiver 130 are preferably all located inside the housing 140 to shield these components from dust, sweat and other environmental pollutants.

The origin of the bone conducted speech component of the total sound pressure in the ear canal volume 323 generated by the user's own voice is schematically illustrated by bone conducted sound waves 324 propagating from the user's mouth through the bony portion (not shown) of the user's ear canal. The vocal efforts of the user also generate an air borne component of the ear canal sound pressure of the user's own voice 302. This air borne component of the ear canal sound pressure generated by the user's own voice and/or other environmental sounds propagate to the ambient microphone 140, the processing unit 110, the miniature receiver 130, the flexible sound tube 160 and the ear mould 150 to the ear canal volume 323.

Accordingly, depending on the technology of the bone conduction sensor 151, the bone conduction sensor may sense a combination of bone-conducted sound waves 324 and airborne sound waves 302 where the latter may originate from the user's mouth and/or from other environmental sound sources. Accordingly, in some embodiments, the processing unit may be configured to filter the bone conduction signal generated by the bone conduction sensor 151 so as to filter out the contributions originating from sound picked up by microphone 140 and emitted by loudspeaker 130 into the user's ear canal. An embodiment of such a compensation filtering mechanism is described in EP3188507. Hence, the signal processing unit 110 may provide a compensated bone conduction signal which is dominated by the bone conducted own voice component of the total ear canal sound pressure within the ear canal volume 323, because other components of the ear canal sound pressure which represent the environmental sound, are markedly suppressed or cancelled. The skilled person will understand that the actual amount of suppression of the environmental sound pressure components inter alia depends on how accurately the compensation filter is able to model the acoustic transfer function between the loudspeaker and the ear canal microphone. It will further be appreciated that other embodiments of bone conduction sensors may not require any compensation or they may require a different type of preprocessing of the bone conduction signal.

The hearing device 100 further includes a wireless communications unit, which comprises an antenna 180 and a radio portion or transceiver 170, that is configured to communicate wirelessly with the signal processing device 200. The processing unit 110 comprises a communications controller 113 configured to perform various tasks associated with the communications protocols and possibly other tasks. The communications controller 113 may e.g. be a Bluetooth LE controller. The communications controller 113 may be configured for performing the various communication protocol related tasks, e.g. in accordance with the audio-enabled Bluetooth LE protocol, and possibly other tasks. The hearing device 100 is configured to forward the bone conduction signal sensed by the bone conduction sensor 151, optionally after filtering and/or other signal processing, via the transceiver 170 and the antenna 180 to the signal processing device 200.

Even though the hearing loss processor 111 and the communications controller 113 are shown as separate blocks in FIG. 1B, it will be appreciated that they may completely or partially be integrated into a single unit. For example, the processing unit 110 may comprise a software programmable microprocessor such as a Digital Signal Processor (DSP) which may be configured to implement the hearing loss processor 111 and/or the communications controller 113, or parts thereof. The operation of the hearing device 100 may be controlled by a suitable operating system executed on the software programmable microprocessor. The operating system may be configured to manage hearing device hardware and software resources, e.g. including the hearing loss processor 111 and possibly other processors and associated signal processing algorithms, the wireless communications unit, memory resources etc. The operating system may schedule tasks for efficient use of the hearing device resources and may further include accounting software for cost allocation, including power consumption, processor time, memory locations, wireless transmissions, and other resources.

It will be appreciated that other embodiments of a hearing apparatus may include a different type of head-worn hearing device, e.g. a device without any ambient microphone and/or without any loudspeaker and the associated circuitry.

The signal processing device 200 comprises an antenna 210 and a radio portion or circuit 240 that is configured to communicate wirelessly via antenna 210 with the corresponding radio portion or circuit of the hearing device 100. The signal processing device 200 also comprises a processing unit 220 which comprises a communications controller 221, a memory 222 and a central processing unit 223. The communications controller 221 may e.g. be a Bluetooth LE controller. The communications controller 221 may be configured for performing the various communication protocol related tasks, e.g. in accordance with the audio-enabled Bluetooth LE protocol, and possibly other tasks.

The signal processing device is configured to receive a bone conduction signal from the hearing device 100. To this end, data packets representing the bone conduction signal may be received by the radio portion or circuit 240 via RF antenna 210 and be forwarded to the communications controller 221 and further to the central processing unit 223 for further signal processing. In particular, the central processing unit 223 is configured to implement a synthetic speech generation process based on a trained speech model that receives the bone conduction signal as a control input.

To this end, the signal processing device comprises a memory 222 for storing model parameters of the speech model. In particular, the memory 222 may be configured to store adaptable model parameters obtained by a machine learning training process as described herein. Even though the memory 222 is shown as part of the processing unit 220, it will be appreciated that the memory may be implemented as a separate unit communicatively coupled to the processing unit 220.

The central processing unit 223 is further configured to output the generated synthetic speech via a suitable output interface 230 of the signal processing device 200, e.g. via a wired or wireless communications interface. The output interface may be a Bluetooth interface, another short-range wireless communications interface; a cellular telecommunications interface, a wired interface and/or the like. In some embodiments, the output interface may be integrated into or otherwise combined with the circuit 240.

The signal processing device 200 may further comprise a microphone 250 for receiving and recording air-borne sound generated by the user's voice. The microphone signal generated by the microphone 250 may be used when the hearing signal processing device 200 is operated in a recording and/or training mode, in particular so as to create training examples as described below. Alternatively or additionally, the microphone 250 may be used for supplementing the generated synthetic speech as is always described below. In alternative embodiments, the signal processing device does not include any microphone that is used for the purpose of the speech generation as described herein.

The signal processing device may be a suitably programmed smartphone, tablet computer, smart TV or other electronic device, such as audio-enabled device. The signal processing device may be configured to execute a suitable computer program, such as an app or other form of application software. The skilled person will appreciate that the signal processing device 200 will typically include numerous additional hardware and software resources in addition to those schematically illustrated as is well-known in the art of mobile phones.

Figure 2A:
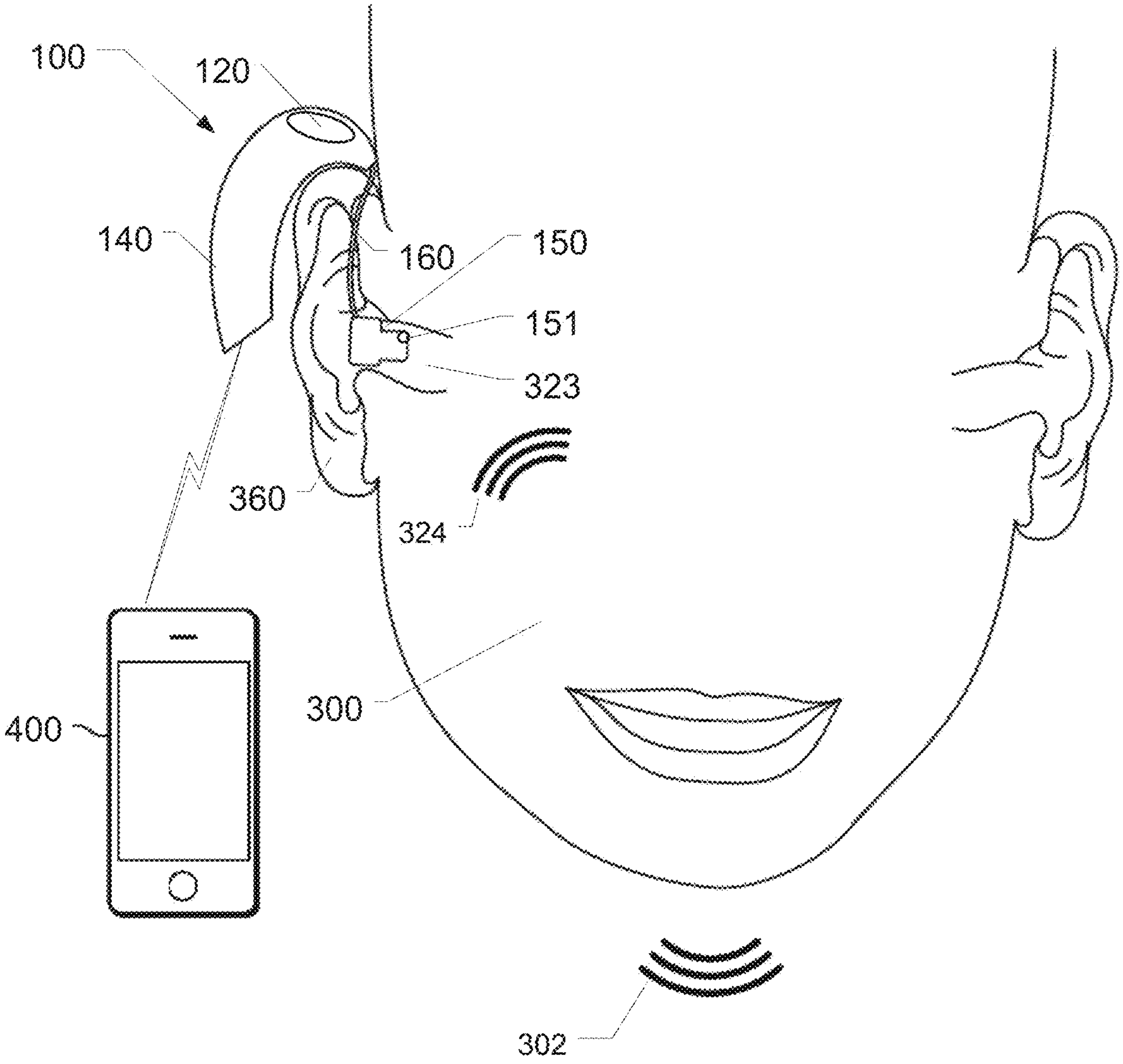
FIG. 2A schematically illustrates another example of a hearing apparatus.
Figure 2B:
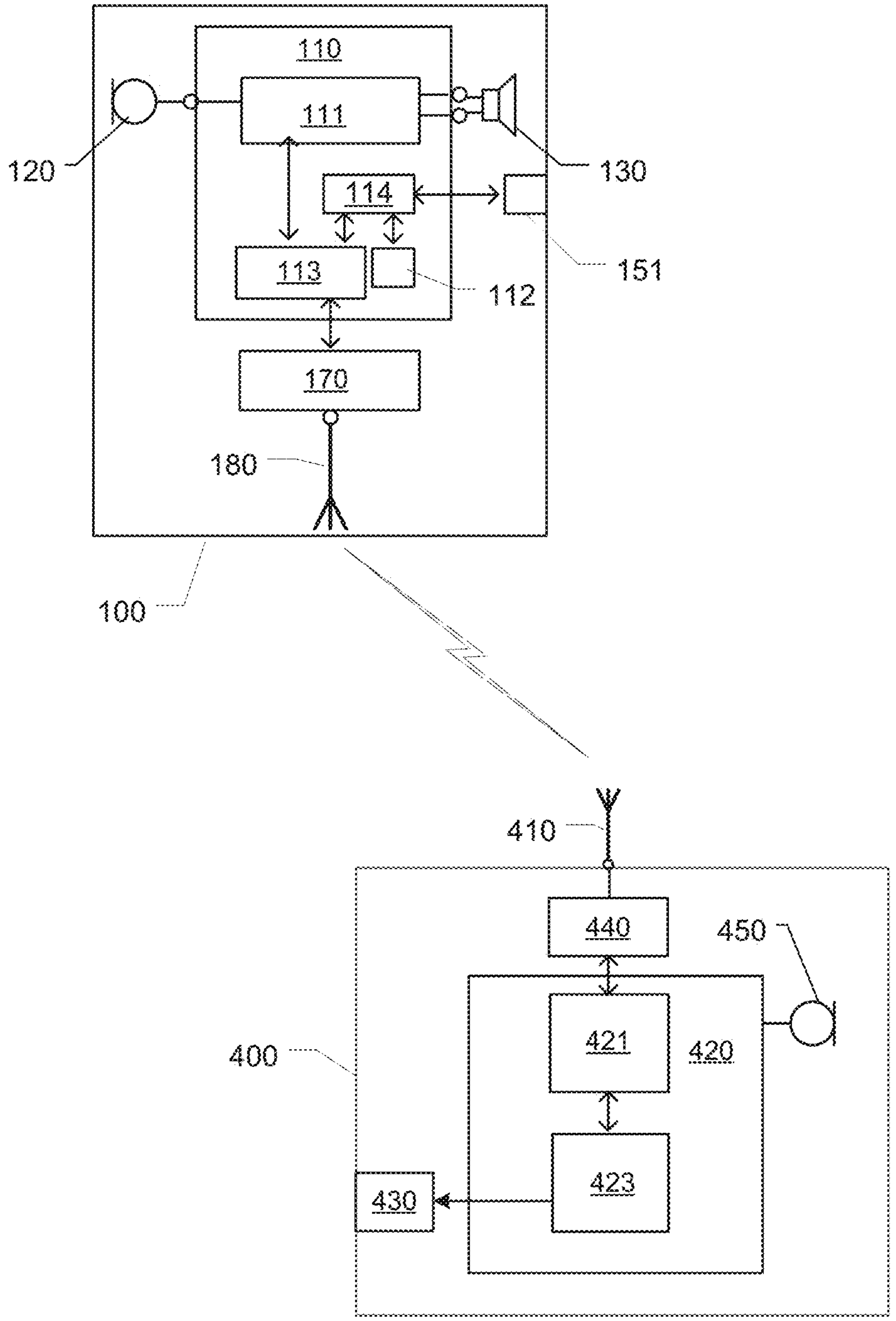
FIG. 2B schematically illustrates a block diagram of the hearing apparatus of FIG. 2A.

FIG. 2A schematically illustrates another example of a hearing apparatus and FIG. 2B schematically illustrates a block diagram of the hearing apparatus of FIG. 2A.

The hearing apparatus of FIGS. 2A-B is similar to the hearing apparatus of FIGS. 1A-B, except that, in the embodiment of FIGS. 2A-B, the head-worn hearing device 100 generates the synthetic speech. In particular, the hearing apparatus of FIGS. 2A-B includes a head-worn hearing device and a user accessory device 400. In the example of FIG. 2A, the hearing device 100 is a BTE hearing instrument or aid mounted on a user's ear 360 or ear lobe. It will be appreciated that other embodiments may include another type of hearing device, e.g. as described in connection with FIGS. 1A-B.

The hearing device 100 comprises a housing or casing 140, an ambient microphone 120, a processing unit 110, a loudspeaker or receiver 130, an ear mould or plug 150, a flexible sound tube 160, a bone conduction sensor 151, an antenna 180, a radio portion or transceiver 170, a communications controller 113, all as described in connection with FIGS. 1A-B. Accordingly, these components and possible variations thereof will not be described in detail again.

The embodiment of FIGS. 2A-B differs from the embodiment of FIGS. 1A-B in that the processing unit of the embodiment of FIGS. 2A-B comprises a signal processing unit 114 which is configured to receive the bone conduction signal, optionally after filtering and/or other signal processing, from the bone conduction sensor 151 and which is configured to implement a synthetic speech generation process based on a trained speech model that receives the bone conduction signal as a control input.

To this end, the hearing device 100 comprises a memory 112 for storing model parameters of the speech model. In particular, the memory 112 may be configured to store adaptable model parameters obtained by a machine learning training process as described herein. Even though the memory 112 is shown as part of the processing unit 110, it will be appreciated that the memory may be implemented as a separate unit communicatively coupled to the processing unit 110.

The hearing device 100 is further configured to output the generated synthetic speech via the transceiver 170 and the antenna 180 to the user accessory device 400 and/or to another device external to the hearing device 100.

The user accessory device 400 comprises an antenna 410 and a radio portion or circuit 440 that is configured to communicate wirelessly via antenna 410 with the corresponding radio portion or circuit of the hearing device 100. The user accessory device 400 also comprises a processing unit 420 which comprises a communications controller 421 and a central processing unit 423. The communications controller 421 may e.g. be a Bluetooth LE controller. The communications controller 421 may be configured for performing the various communication protocol related tasks, e.g. in accordance with the audio-enabled Bluetooth LE protocol, and possibly other tasks.

The user accessory device 400 is configured to receive the generated synthetic speech signal from the hearing device 100. To this end, data packets representing the synthetic speech signal may be received by the radio portion or circuit 440 via RF antenna 410 and be forwarded to the communications controller 421 and further to the central processing unit 423 for further data processing. In particular, the central processing unit 423 may be configured to implement a user application that is configured to perform user functionality responsive to voice input, e.g. voice controlled functionality. To this end, the user application may implement a suitable voice recognition function.

Alternatively or additionally, the central processing unit 423 may be configured to forward the synthetic speech via a suitable output interface 430 of the user accessory device, e.g. a wired or wireless communications interface. The output interface may be a Bluetooth interface, another short-range wireless communications interface, a cellular telecommunications interface, a wired interface and/or the like.

The user accessory device 400 may further comprise a microphone 450 for receiving and recording air-borne sound generated by the user's voice. The microphone signal generated by the microphone 450 may be used when the hearing apparatus is operated in a recording and/or training mode, in particular so as to create training examples as described below.

The user accessory device may be a suitably programmed smartphone, tablet computer, smart TV or other electronic device, such as audio-enabled device. The user accessory device may be configured to execute a suitable computer program, such as an app or other form of application software. The skilled person will appreciate that the user accessory device 400 will typically include numerous additional hardware and software resources in addition to those schematically illustrated as is well-known in the art of mobile phones.

Figure 3:
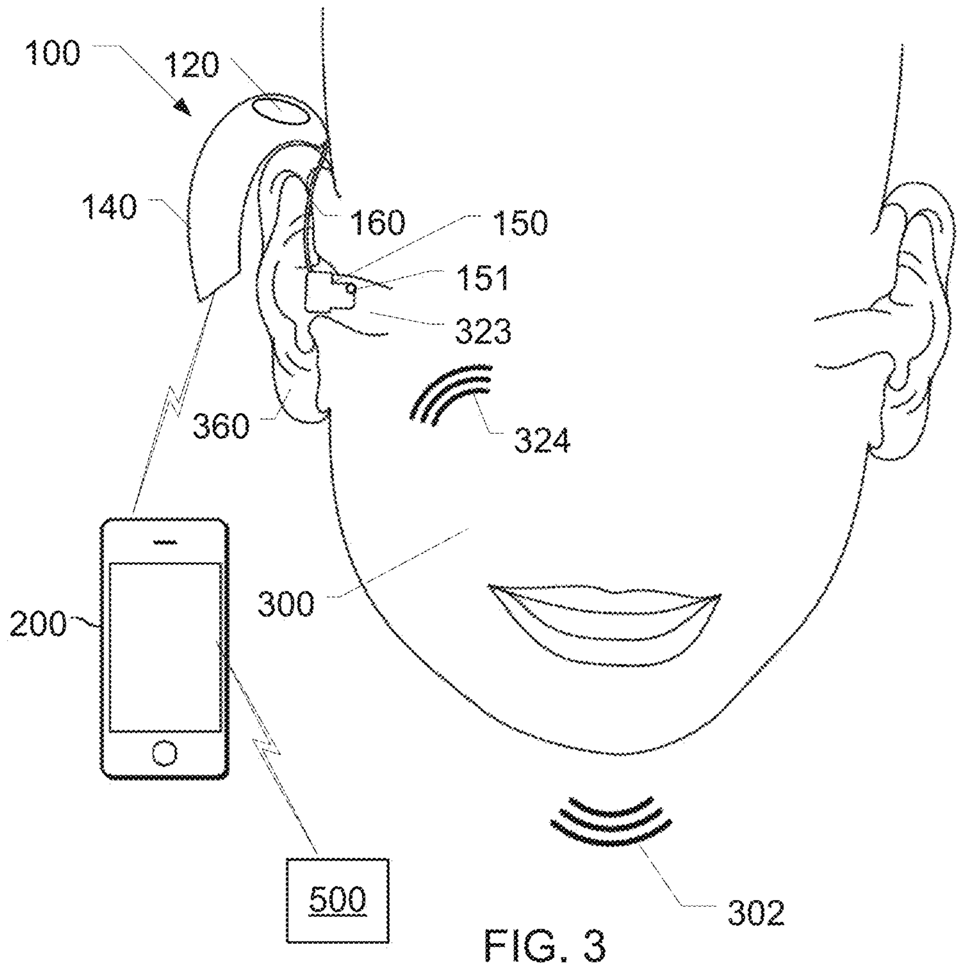
FIG. 3 schematically illustrates an example of a system comprising a hearing apparatus and a remote host system.

FIG. 3 schematically illustrates an example of a system comprising a hearing apparatus and a remote host system. The hearing apparatus comprises a head-worn hearing device 100 and a signal processing device 200 as described in connection with FIGS. 1A-B. The remote host system 500 may be a suitably programmed data processing system, such as a server computer, a virtual machine, etc. The signal processing device 200 and the remote host system 500 are communicatively coupled via a suitable wired or wireless communications link, e.g. via short-range RF communication, via a suitable computer network, such as the internet, or via a cellular communications network or a combination thereof.

The remote host system 500 is configured, e.g. by means of a computer program, to execute a machine learning training process for creating a speech model from a set of training examples. To this end, the remote host system may obtain a suitable set of training examples, e.g. from a database comprising a repository of training examples, from a speech recording system and/or from a hearing apparatus as described herein. To this end, the signal processing unit 200 may be configured, at least when operated in a recording mode, to not only receive the bone conduction signal from the hearing device 100 but also the corresponding ambient microphone signal recorded by microphone 120 concurrently with the recording of the bone conduction signal.

The signal processing device 200 may be configured to store a plurality of recorded signal pairs in an internal memory of the signal processing device and to forward the recorded signal pairs to the remote host system 500 for use as training examples for training a speech model. Alternatively, the signal processing may forward the received signal pairs directly to the remote host system, i.e. without initially storing them in an internal memory.

The remote host system 500 is further configured to forward a representation of the created trained speech model to the signal processing device 200 to allow the signal processing device 200 to implement the trained speech model. For example, the remote host system 500 may forward a set of model parameters to the signal processing device, e.g. a set of network weights.

In alternative embodiments, the signal processing device 200 may include a microphone for recording air borne speech from the user 300 concurrently with the recording of the bone conduction signal by the hearing device 100. The microphone signal recorded by the signal processing device may thus be used to create training examples instead of (or in addition to) microphone signals recorded by the microphone 120 of the hearing device 100. Upon receipt of the bone conduction signal from the hearing device 100, the signal processing device may, at least when operated in recording mode, store a signal pair comprising the bone conduction signal and the concurrently recorded microphone signal that was recorded by the microphone of the signal processing device. Alternatively or additionally to storing the signal pair, the signal processing device may forward the signal pair directly to the remote host system 500.

It will be appreciated that the receipt of a trained speech model and/or the recording of training examples by the hearing apparatus may also be performed by the hearing apparatus of FIGS. 2A-B. For example, the user accessory device 400 may receive signal pairs of recorded vibration and corresponding microphone signals from the hearing device 100. Alternatively, the user accessory device 400 may receive the bone conduction signal from the hearing device and record a corresponding microphone signal by means of a microphone of the user accessory device 400. The user accessory device may then forward the collected training examples to a remote host system. Similarly, the user accessory device may receive data representing a trained speech model from a remote host system and forward the data to the hearing device 100 for storage. Alternatively, the hearing device may receive data representing a trained speech model directly from a remote host system, e.g. by means of a hearing device fitting system as part of a fitting process.

Yet alternatively or additionally, a training process for training a speech model may also be implemented by the signal processing device or user accessory device, or even by the hearing device.

Yet alternatively or additionally, microphone signals recorded by the hearing device and/or by the signal processing device or the user accessory device may be used for supplementing the created synthetic speech signal as described below.

Figure 4:
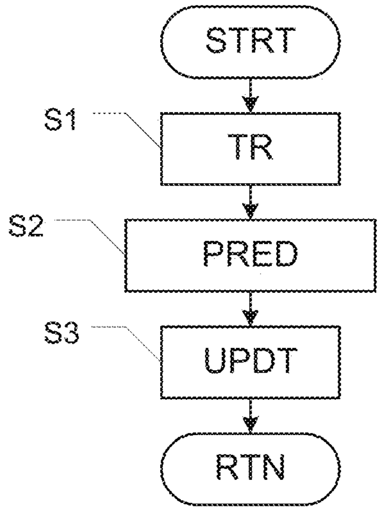
FIG. 4 shows a flow diagram of a process of obtaining a speech signal.

FIG. 4 shows a flow diagram of a process of obtaining a speech signal. The process may be performed by an embodiment of the hearing apparatus disclosed herein, e.g. the hearing apparatus of FIGS. 1A-B or the hearing apparatus of FIGS. 2A-B, or by a hearing apparatus in conjunction with a remote host system, e.g. as illustrated in FIG. 3.

In initial step S1, the process performs a machine-learning training process to create a trained speech model, trained on the basis of a set of training examples. An example of a training process will be described in connection with FIGS. 5 and 6.

In subsequent step S2, the process uses the trained speech model to create synthetic speech based on an obtained bone conduction signal. An example of the creation of the synthetic speech signal will be described in connection with FIGS. 7 and 8.

Optionally, in step S3, the process may subsequently update the initial trained speech model, e.g. by collecting additional training examples during operation of the speech model, e.g. as a part of step S2 above, and to perform an additional training step, e.g. a training step as in step S1.

Figure 5:
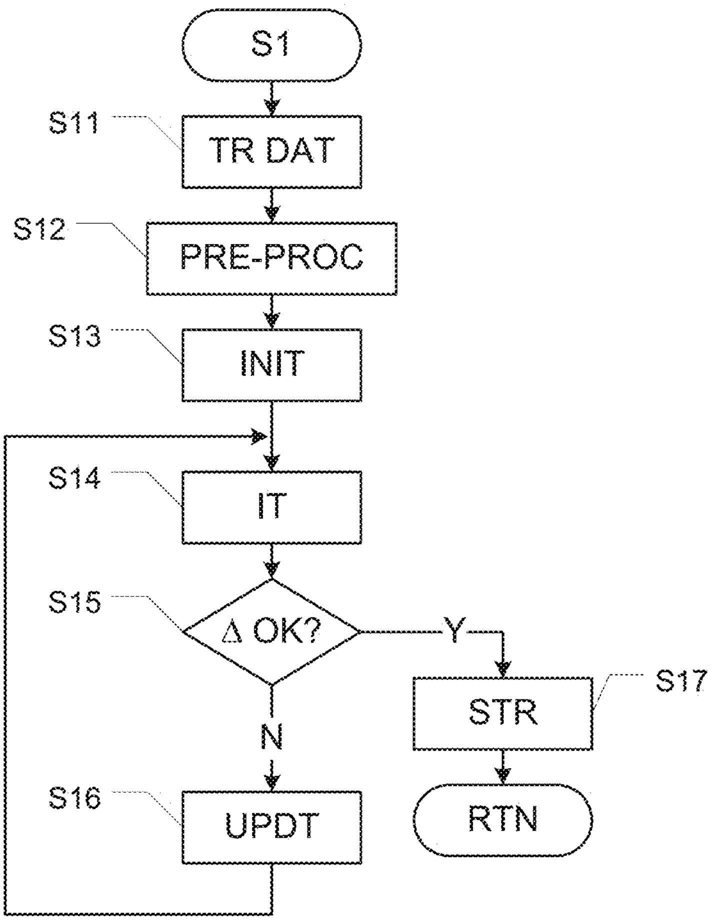
FIG. 5 illustrates a flow diagram of a process of training a speech model for generating synthetic speech.

FIG. 5 illustrates a flow diagram of a process of training a speech model for generating synthetic speech. The process may be performed by an embodiment of the hearing apparatus disclosed herein, e.g. the hearing apparatus of FIGS. 1A-B or the hearing apparatus of FIGS. 2A-B, or by a hearing apparatus in conjunction with a remote host system, e.g. as illustrated in FIG. 3.

In initial step S11, the process obtains training examples. In particular the process obtains pairs of bone conduction signals and corresponding speech signals. The bone conduction signals may be obtained by the bone conduction sensor of a hearing apparatus described herein. The corresponding speech signals may be obtained from an ambient microphone recording air borne sound when a subject wearing the bone conduction sensor speaks. In particular, the bone conduction signal and the corresponding ambient microphone signal of a signal pair are recorded concurrently, i.e. such that they represent respective recordings of the same speech of the subject wearing the bone conduction sensor. During training, the ambient microphone signals are used as target signals. Accordingly, some or all of the microphone signals may be recorded in a low-noise environment so as to facilitate training the speech model to synthesize clean speech. The bone conduction signals and the microphone signals may be represented as respective sequences of sampled signal values representing a waveform. To this end, each of the signals may be sampled at a suitable sampling rate, such as at 4 kHz.

Optionally, in step S12, the bone conduction signals and/or the microphone signals are processed prior to using them as training examples for training the speech model. Examples of processing steps may include: normalizing the lengths of the respective signal pairs, re-sampling the signals, filtering the signals, adding synthetic noise, and/or the like.

In particular, in some embodiments, the speech model is trained to only synthesize low frequencies of a synthetic speech signal, in particular to reconstruct a low-pass version of the ambient microphone signal. To this end, the ambient microphone signals of the training examples may be low-pass filtered using a suitable cut-off frequency, e.g. between 0.8 and 2.5 kHz, such as between 1 kHz and 2 kHz. The low-pass filtered microphone signals may then be used as target signals for the training process.

In step S13, the process initializes the speech model. In particular, the process initializes a predetermined model architecture, such as a neural network model having a plurality of network layers and comprising a plurality of interconnected network nodes. Initializing the speech model may thus include selecting a model type, selecting a model architecture, selecting a size and/or structure and/or interconnectability of the speech model, selecting initial values of adaptable model parameters, etc. The process may further select one or more parameters of the training process, such as a learning rate, a training algorithm, a cost function to be minimized, etc. Some or even all of the above parameters may be pre-selected or automatically be selected by the process. Nevertheless, some or even all of the above parameters may be selected based on user input. An example of a suitable speech model will be described in more detail below. In some embodiments, a previously trained speech model may serve as a starting point for the training process, e.g. so as to improve a general-purpose model based on speaker-specific training examples obtained from the intended user of the hearing apparatus.

In step S14, the speech model is presented with bone conduction signals of the set of training examples and the model output is compared with the target values corresponding to the respective training examples so as to compute a cost function.

In step S15, the process compares the computed cost function with a success criterion. If the success criterion is fulfilled the process proceeds at step S17; otherwise the process proceeds at step S16.

At step S16, the process adjusts some or all of the adaptable model parameters of the speech model, i.e. based on a training algorithm configured to reduce the cost function. The process then returns to step S14 to perform a subsequent iteration of an iterative training process.

Examples of suitable training algorithms, mechanisms for selecting initial model parameters, cost functions, etc. are known to the person skilled in the art of machine learning. For example, the training process may be based on an error backpropagation algorithm.

In step S17, the process represents the trained speech model, including the optimized model parameters of the model in a suitable data structure in which the speech model can be represented in a hearing apparatus.

Figure 6:
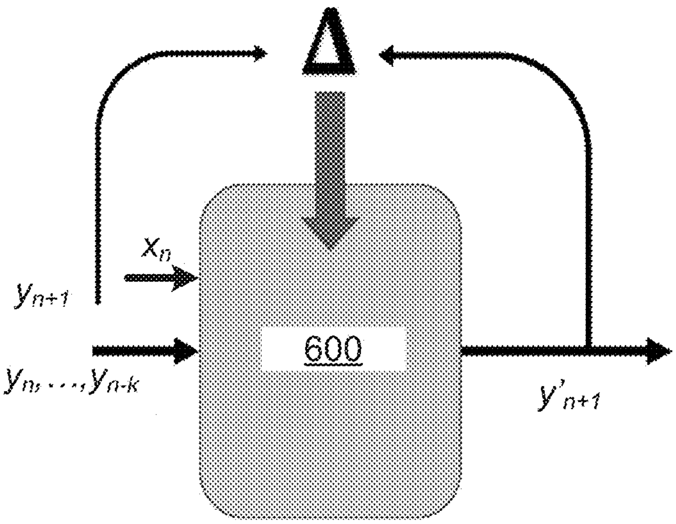
FIG. 6 schematically illustrates an example of the training process.

FIG. 6 schematically illustrates an example of a training process for an autoregressive speech model 600 that is configured to operate in multiple passes while maintaining an internal state of the model 600. At each pass n—n representing time increments corresponding to a suitable sampling rate—the model receives a current value $x_n$ of the bone conduction signal and k (k≥1) previous samples of the target signal $y=(y_1, \ldots, y_N)$. The speech model predicts a subsequent predicted value $y'_{n+1}$ of the speech signal. It will be appreciated that other embodiments may receive another representation of the bone conduction signal $x=(x_1, \ldots, x_N)$, e.g. the current sample $x_n$ and a number of previous samples, or an encoded version of the signal representing one or more time-dependent features of the bone conduction signal.

The predicted value $y'_{n-1}$ is compared to the corresponding value $y_{n+1}$ of the target speech signal. A difference or cost function A computed based on these and, optionally other, values may be used as a cost function for adapting the speech model 600. For example, in some embodiments the speech model outputs a probability distribution over a plurality of classes where the number of classes corresponds to the resolution of the resulting synthetic speech signal. In such an embodiment the difference Δ may be the cross-entropy or another suitable difference measure between the predicted distribution and the true speech as represented by the target signal.

As multiple training examples are repeatedly fed through the model the speech model 600 may successively be adapted so as to cause the predicted values y' resulting from the model to provide an increasingly better prediction of the target signal y when the model is driven by the bone conduction signal x.

The trained model may then be stored in the hearing apparatus.

Figure 7:
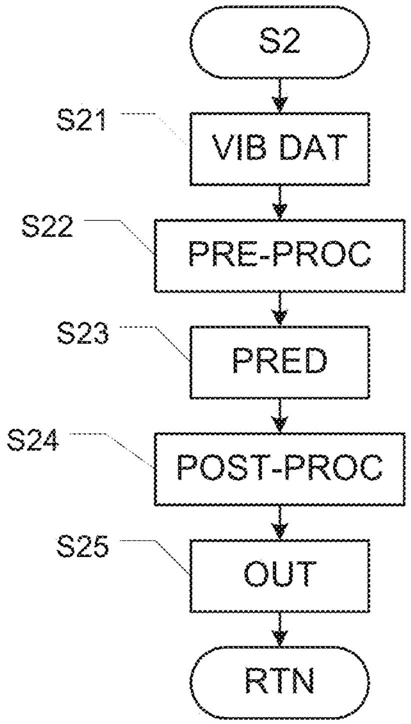
FIG. 7 illustrates a flow diagram of a process of creating a synthetic speech signal using trained speech model.

FIG. 7 illustrates a flow diagram of a process of creating a synthetic speech signal using a trained speech model, e.g. a speech model trained by the process of FIGS. 5 and/or 6. The process may be performed by an embodiment of the hearing apparatus disclosed herein, e.g. the hearing apparatus of FIGS. 1A-B or the hearing apparatus of FIGS. 2A-B.

In initial step S21, the process obtains a bone conduction signal. The bone conduction signals are obtained by the bone conduction sensor of a hearing apparatus described herein. The bone conduction signal may be represented as respective sequences of sampled signal values representing a waveform. To this end, the bone conduction signal may be sampled at a suitable sampling rate, such as at 4 kHz. In some embodiments, the process further obtains an ambient microphone signal recorded concurrently with the bone conduction signal.

Optionally, in step S22, the bone conduction signal is processed prior to feeding into the trained speech model. Examples of processing steps may include: re-sampling the signal, filtering the signal, and/or the like.

In step S23, the process feeds a representation of the obtained bone conduction signal as a control signal into the trained speech model and computes a synthesized speech signal generated by the trained speech model.

Figure 8:
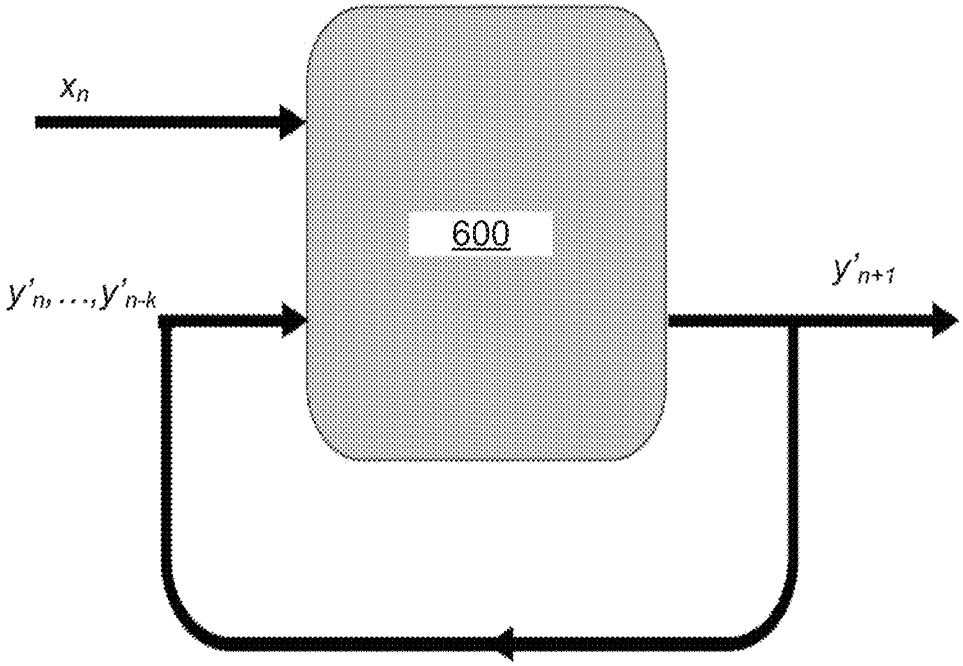
FIG. 8 schematically illustrates an example of the synthetic speech generation process based on a training speech model.

FIG. 8 schematically illustrates an example of the synthetic speech generation process based on a training autoregressive speech model 600. The speech model 600 is configured to operate in multiple passes while maintaining an internal state of the model 600. At each pass n, the model receives a current value $x_n$ of the bone conduction signal (or another representation of the bone conduction signal) and k (k≥1) previous samples of the generated synthetic speech model y'. The speech model predicts a subsequent predicted value $y'_{n+1}$ of the speech signal.

Again, referring to FIG. 7, optionally, in step S24, the process may post-process the synthetic speech model generated by the speech model. For example, as discussed above, in some embodiments the speech model may have been trained to only generate low frequencies of synthetic speech. In such embodiments, the post-processing may comprise mixing the synthetic speech signal with a high-pass filtered ambient microphone signal that has been recorded concurrently with the bone conduction signal. To this end, the concurrently recorded microphone signal may be high-pass filtered using a suitable cut-off frequency complementary to the frequency band of the synthetic speech signal, e.g. a cut-off frequency between 0.8 and 2.5 kHz, such as between 1 kHz and 2 kHz.

Finally, in step S25, the synthetic speech signal, optionally after post-processing, is provided as an output of the process, e.g. in the form of a digital waveform. The generated synthetic speech signal may then be used for different applications, such as hands-free operation of a mobile or voice commands, either by the device generating the synthetic speech or by an external device to which the generated signal is transmitted.

Figure 9:
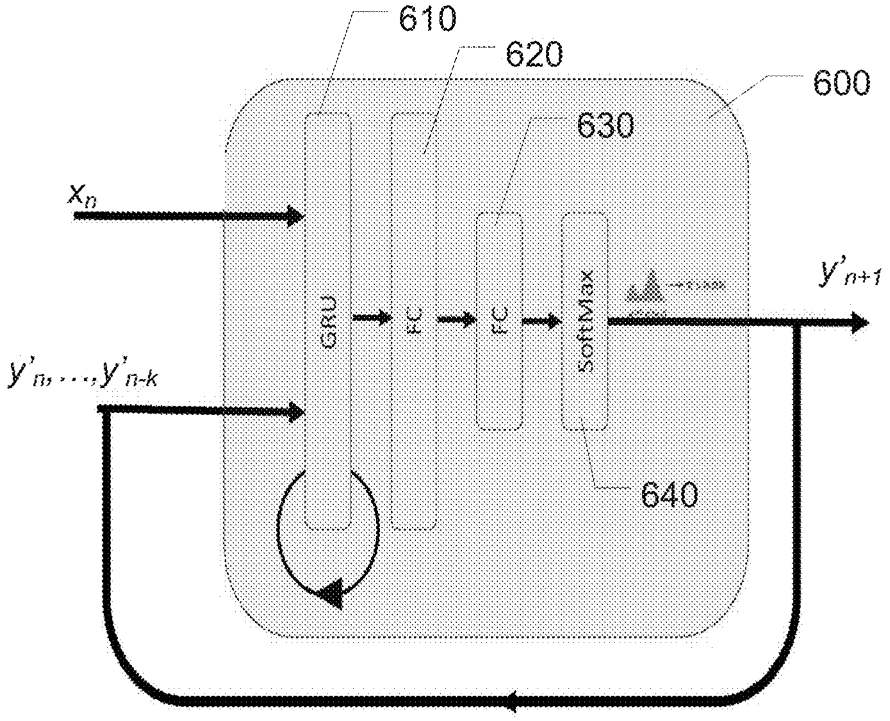
FIG. 9 schematically illustrates an example of a speech model.

FIG. 9 illustrates an example of a speech model 600. The speech model of FIG. 9 is an autoregressive speech model as described in connection with FIGS. 6 and 8.

The speech model of FIG. 9 is deep neural network, i.e. a layered neural network comprising 3 or more network layers. In the example of FIG. 9, four such layers 610, 620, 630 and 640, respectively are illustrated. However, it will be appreciated that other embodiments of a deep neural network may have a different number of layers, such as more than four layers.

The neural network of FIG. 9 comprises a recurrent layer 610, such as a layer comprising gated recurrent units, followed by two intermediate layers 620 and 630 and a final softmax layer 640.

The model 600 outputs a probability distribution over a plurality of classes where the number of classes corresponds to the resolution of the resulting synthetic speech signal. For example, a model having 256 output classes may represent an 8-bit synthetic speech signal.

In particular, the speech model may be configured to model the joint distribution of high-dimensional audio data via factorization of the joint distribution into the product of the individual speech sample distributions conditioned on some or all previous samples and conditioned on the bone conduction signal $x=(x_1, \ldots, x_N)$. The joint probability of a sequence of waveform samples may thus be expressed as $$P(y) = \prod_{n=1}^{N} P(y_n \mid y_{n-1}, \ldots, y_1; \hat{x})$$

where $\hat{x}$ is a representation of the bone conduction signal x used as a conditional input to the speech model. In some embodiments, $\hat{x}$ may be a MEL representation of the bone conduction signal, while, in other embodiments, the individual waveform samples of the bone conduction signal may be directly used as conditional signal:

$$P(y) = \prod_{n=1}^{N} P(y_n \mid y_{n-1}, \ldots, y_1; x_n)$$

It will be understood that, in some embodiments, more than one sample of the bone conduction signal x may be used, e.g. a sliding window $(x_n, \ldots, x_{n-l})$ for a suitable window size l≥1.

Some examples of a suitable speech model may utilise model architectures known from variants of the WaveRNN architecture, e.g. as described in "Efficient Neural Audio synthesis" by Nal Kalchbrenner et al., arXiv:1802.08435, or as described in "LPCNET: Improving Neural Speech Synthesis Through Linear Prediction" by Jaen-Marc Valin and Jan Skoglund, arXiv:1810.11846. Other examples of a suitable speech model may utilise model architectures known from variants of the WaveNet architecture, e.g. as described in "ClariNet: Parallel Wave Generation in End-to-End Text-to-Speech" by Wei Ping et al., arXiv:1807.07281. However, instead of text input, embodiments of the process and system described herein use the bone conduction signal as a conditional signal to be fed into the speech synthesizer.

At least some aspects described herein may be summarised in the following list of enumerated items:

1. A hearing apparatus comprising:
   - a bone conduction sensor configured to convert bone vibrations of voice sound information into a bone conduction signal;
   - a signal processing unit configured to implement a synthetic speech generation process, the synthetic speech generation process implementing a speech model; wherein the synthetic speech generation process receives the bone conduction signal as a control input and outputs a synthetic speech signal.

2. A hearing apparatus according to item 1; wherein the speech model defines an internal state that, during operation, evolves over time.

3. A hearing apparatus according to any one of the preceding items; wherein the speech model is a trained machine learning model, trained based on a plurality of training speech examples.

4. A hearing apparatus according to item 3; wherein each training speech example comprises a training bone conduction signal representing a speaker's speech and a corresponding training microphone signal representing airborne sound of the speaker's speech recorded by an ambient microphone, the airborne sound being recorded concurrently with the recording of the training bone conduction signal.

5. A hearing apparatus according to any one of items 3 through 4; wherein the machine learning model comprises a neural network.

6. A hearing apparatus according to item 5; wherein the neural network comprises a recurrent neural network.

7. A hearing apparatus according to item 6; wherein the recurrent neural network is operated in a density estimation mode.

8. A hearing apparatus according to any one of items 5 through 7; wherein the neural network comprises a layered neural network comprising two or more layers.

9. A hearing apparatus according to any one of the preceding items; wherein the speech model comprises an autoregressive speech model.

10. A hearing apparatus according to any one of the preceding items; wherein the speech model computes a probability distribution over a plurality of output classes, each output class representing a sample value of a sample of a sampled audio waveform.

11. A hearing apparatus according to any one of the preceding items; comprising a head-worn hearing device, the head-worn hearing device comprising the bone conduction sensor and a first communications interface.

12. A hearing apparatus according to item 11; wherein the head-worn hearing device further comprises the signal processing unit, and wherein the head-worn device is configured to communicate the synthetic speech signal via the first communications interface to an external device, external to the head-worn hearing device.

13. A hearing apparatus according to item 11; comprising a signal processing device; wherein the head-worn hearing device is configured to communicate the bone conduction signal via the first communications interface to the signal processing device; wherein the signal processing device comprises the signal processing unit and a second communications interface configured to receive the bone conduction signal.

14. A hearing apparatus according to any one of the preceding items; comprising an ambient microphone configured to record air-borne speech spoken by a user of the hearing apparatus and to provide an ambient microphone signal indicative of the recorded air-born speech.

15. A hearing apparatus according to item 14; comprising a memory for storing training data, the training data comprising one or more signal pairs, each signal pair comprising a training bone conduction signal recorded by the bone conduction sensor and a training ambient microphone signal recorded by the ambient microphone concurrently with the recording of the training bone conduction signal of said signal pair.

16. A hearing apparatus according to any one of items 14 through 15; wherein the speech model is configured to generate a synthetic filtered speech signal, corresponding to a speech signal filtered by a first filter, when the speech model receives the bone conduction signal as a control input; and wherein the signal processing unit is configured to receive an ambient microphone signal from the ambient microphone, the ambient microphone signal being recorded concurrently with the bone conduction signal; to create a filtered version of the received ambient microphone signal using a second filter, complementary to the first filter, and to combine the generated synthetic filtered signal with the created filtered version of the received ambient microphone signal to create an output speech signal.

17. A hearing apparatus according to any one of the preceding items; wherein the signal processing unit is configured to be operated in a training mode; wherein the signal processing unit; when operated in the training mode, is configured to adapt one or more model parameters of the speech model based on a result of the synthetic speech generation process when receiving a training bone conduction signal and according to a model adaptation rule so as to determine an adapted speech model that provides an improved match between the created synthetic speech and a corresponding training ambient microphone signal.

18. A hearing apparatus according to any of the preceding items, comprising a hearing instrument or hearing aid such as a BTE, RIE, ITE, ITC or CIC hearing instrument.

19. A computer-implemented method of obtaining a speech signal; comprising:

receiving a bone conduction signal from a bone conduction sensor configured to convert bone vibrations of voice sound information into the bone conduction signal;

using a speech model to generate a synthetic speech signal, wherein the speech model receives the bone conduction signal as a control input.

20. A computer-implemented method of training a speech model for generating synthetic speech, the method comprising:

receiving a plurality of pairs of training signals, each pair comprising a bone conduction signal from a bone conduction sensor and an ambient microphone signal from an ambient microphone where the ambient microphone signal is recorded concurrently with the bone conduction signal;

using the bone conduction signals as a control input to the speech model;

adapting the speech model based on a comparison of the synthetic speech generated by the speech model, when the speech model receives one or more of the bone conduction signals as a control input, with the respective one or more ambient microphone signals.

21. A computer program product, configured to cause, when executed by a signal processing unit and/or a data processing system, the signal processing unit and/or data processing system to perform the acts of the method according to any one of items 19 through 20.

Although the above embodiments have mainly been described with reference to certain specific examples, various modifications thereof will be apparent to those skilled in art without departing from the spirit and scope of the invention as outlined in claims appended hereto. For example, while the various aspects disclosed herein have mainly been described in the context of hearing aids, they may also be applicable to other types of hearing devices. Similarly, while the various aspects disclosed herein have mainly been described in the context of a Bluetooth LE short-range RF communication between the devices, it will be appreciated that the communications between the devices may use other communications technologies, such as other wireless or even wired technologies.

The invention claimed is:

1. A hearing apparatus comprising:

a bone conduction sensor configured to provide a bone conduction signal indicative of bone-conducted vibration conducted by a bone of a wearer of the hearing apparatus; and a signal processing unit comprising a speech model, the speech model comprising a neural network model configured to obtain a representation of the bone conduction signal as a control input, wherein the signal processing unit is configured to provide a synthetic speech signal;

wherein the signal processing unit is configured to predict a current sample of a time series from one or more previous samples of the time series, the time series representing a speech waveform, wherein the signal processing unit is configured to predict the current sample of the time series based on the representation of the bone conduction signal;

wherein the neural network model comprises a layer implemented as a part of the neural network model of the signal processing unit that provides the synthetic speech signal;

wherein the neural network model is trained based on a plurality of training speech samples; and wherein at least one of the training speech samples comprises a training bone conduction data representing a speech and a corresponding training microphone data representing airborne sound of the speech, the training microphone data and the training bone conduction data corresponding with each other temporally.

2. The hearing apparatus according to claim 1, wherein the speech model defines an internal state that evolves over time.

3. The hearing apparatus according to claim 1, wherein the neural network comprises a recurrent neural network.

4. The hearing apparatus according to claim 3, wherein the recurrent neural network has a density estimation mode during operation.

5. The hearing apparatus according to claim 1, wherein the neural network comprises a layered neural network comprising two or more layers, at least one of the two or more layers being a softmax layer.

6. The hearing apparatus according to claim 1, wherein the speech model comprises an autoregressive speech model.

7. The hearing apparatus according to claim 1, wherein the speech model is configured to compute a probability distribution over a plurality of output classes, at least one of the output classes representing a sample value of a sample of a sampled audio waveform.

8. The hearing apparatus according to claim 1, further comprising a head-worn hearing device, the head-worn hearing device comprising the bone conduction sensor and a first communication interface.

9. The hearing apparatus according to claim 8, wherein the head-worn hearing device further comprises the signal processing unit, and wherein the head-worn hearing device is configured to communicate the synthetic speech signal via the first communication interface to a handheld communication device.

10. The hearing apparatus according to claim 8, further comprising a signal processing device, the signal processing device comprising the signal processing unit and a second communication interface;

wherein the first communication interface of the head-worn hearing device is configured to communicate the bone conduction signal to the second communication interface of the signal processing device.

11. The hearing apparatus according to claim 1, further comprising an ambient microphone configured to detect air-borne speech spoken by the wearer of the hearing apparatus, and to provide an ambient microphone signal indicative of the detected air-borne speech.

12. The hearing apparatus according to claim 1, further comprising a memory configured to store training data, the training data comprising one or more signal pairs, at least one of the signal pairs comprising the training bone conduction data and the training microphone data.

13. The hearing apparatus according to claim 1, wherein the signal processing unit is configured to generate a synthetic filtered signal corresponding to a speech signal filtered by a first filter, after receiving the representation of the bone conduction signal as the control input.

14. The hearing apparatus according to claim 13, wherein the synthetic filtered signal is the synthetic speech signal.

15. The hearing apparatus according to claim 1, wherein the hearing apparatus is a hearing aid.

16. The hearing apparatus according to claim 1, wherein the hearing apparatus is a BTE, RIE, ITE, ITC or CIC hearing instrument.

17. A hearing apparatus comprising:

a bone conduction sensor configured to provide a bone conduction signal indicative of bone-conducted vibration conducted by a bone of a wearer of the hearing apparatus; and a signal processing unit comprising a speech model, the speech model comprising a neural network model configured to obtain a representation of the bone conduction signal as a control input, wherein the signal processing unit is configured to provide a synthetic speech signal;

wherein the signal processing unit is configured to generate a synthetic filtered signal corresponding to a speech signal filtered by a first filter; and wherein the signal processing unit is configured to receive an ambient microphone signal associated with an ambient microphone, the ambient microphone signal and the bone conduction signal corresponding with each other temporally, and wherein the signal processing unit is configured to create a filtered version of the received ambient microphone signal using a second filter, and to combine the generated synthetic filtered signal with the created filtered version of the received ambient microphone signal to create the synthetic speech signal.

18. The hearing apparatus according to claim 17, wherein the speech model is a machine learning model, and wherein the machine learning model is trained based on a plurality of training speech samples.

19. The hearing apparatus according to claim 18, wherein at least one of the training speech samples comprises a training bone conduction data and a corresponding training microphone data, the training microphone data and the training bone conduction data corresponding with each other temporally.

20. The hearing apparatus according to claim 17, wherein the signal processing unit, when in a training mode, is configured to adapt one or more model parameters of the speech model.

21. The hearing apparatus according to claim 20, wherein the adapted one or more model parameters are configured to allow the speech model to provide an improved match between a model output representing the synthetic speech and a corresponding training ambient microphone signal.

22. A processor-implemented method of obtaining a synthetic speech signal, comprising:

receiving, by a processing unit of an apparatus, a bone conduction signal from a bone conduction sensor, the bone conduction sensor configured to detect a bone-conducted vibration conducted by a bone of a person; and using the signal processing unit to predict a current sample of a time series from one or more previous samples of the time series, the time series representing a speech waveform, wherein the signal processing unit is configured to predict the current sample of the time series based on the bone conduction signal, wherein the signal processing unit comprises a neural network model configured to receive the bone conduction signal as a control input;

wherein the neural network model comprises a layer implemented as a part of the neural network model of the signal processing unit;

wherein the neural network model is trained based on a plurality of training speech samples; and wherein at least one of the training speech samples comprises a training bone conduction data representing a speech and a corresponding training microphone data representing airborne sound of the speech, the training microphone data and the training bone conduction data corresponding with each other temporally.

* * * * *